United States Patent
Liao

(10) Patent No.: US 11,041,761 B2
(45) Date of Patent: Jun. 22, 2021

(54) OPTICAL SENSING CIRCUIT AND METHOD FOR DETERMINING LIGHT COLOR BY USING THE SAME

(71) Applicant: AU OPTRONICS CORP., Hsin-Chu (TW)

(72) Inventor: Yi-Yang Liao, Hsinchu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 16/914,516

(22) Filed: Jun. 29, 2020

(65) Prior Publication Data
US 2021/0033464 A1 Feb. 4, 2021

(30) Foreign Application Priority Data
Jul. 31, 2019 (TW) .................................. 108127281

(51) Int. Cl.
*G01N 21/25* (2006.01)
*G01J 3/50* (2006.01)

(52) U.S. Cl.
CPC ...................................... *G01J 3/50* (2013.01)

(58) Field of Classification Search
CPC ...... G01J 3/51; G01J 3/513; G01J 3/50; G01J 3/46; G01J 3/02
USPC ........................................................ 356/406
See application file for complete search history.

(56) References Cited

U.S. PATENT DOCUMENTS

| 9,631,975 | B2 | 4/2017 | Yu et al. |
| 10,175,098 | B2 | 1/2019 | Lin et al. |
| 2006/0077167 | A1* | 4/2006 | Kim .................. G02F 1/133555 345/98 |
| 2009/0078853 | A1* | 3/2009 | Lin .......................... G01J 1/32 250/205 |
| 2020/0158574 | A1 | 5/2020 | Lin et al. |

FOREIGN PATENT DOCUMENTS

TW          I425494          2/2014

* cited by examiner

*Primary Examiner* — Md M Rahman
(74) *Attorney, Agent, or Firm* — WPAT, PC

(57) ABSTRACT

An optical sensing circuit includes a capacitor, and a light sensing unit, a compensation unit, and a switching element coupled to the capacitor. The light sensing unit includes a first light sensing transistor for sensing a first color. The compensation unit includes a second light sensing transistor for sensing a second color. The spectra of the second color and the first color do not overlap each other. When the light illuminates, the light sensing unit generates a first current and the compensation unit generates a second current. The second current reduces the magnitude of the charging or discharging current when the capacitor is charged or discharged by the first current. When the switching element turned on, the voltage of the capacitor is read to determine the color of the light. The voltage level of the gate of the first or second light sensing transistor is adjustable.

20 Claims, 18 Drawing Sheets

OPTICAL SENSING CIRCUIT AND METHOD FOR DETERMINING LIGHT COLOR BY USING THE SAME

This application claims the benefit of Taiwan application Serial No. 108127281, filed Jul. 31, 2019, the subject matter of which is incorporated herein by reference.

BACKGROUND OF THE INVENTION

Field of the Invention

The invention relates in general to an optical sensing circuit and a method for determining light color using the same.

Description of the Related Art

Conventional optical sensing circuit has a thin film transistor (TFT) element (light sensing transistor) and a capacitor coupled to each other. When the light source of a specific color illuminates the optical sensing circuit, the turned-off thin film transistor element will generate a light leakage current. The light leakage current will cause the capacitor to be discharged to generate a voltage change during the illumination process. The input of optical signal could be detected through the voltage change of the capacitor.

However, under strong ambient light such as ambient white light, the optical sensing circuit may generate error actions. Moreover, the thin film transistor (TFT) element, having been illuminated over a long time, will have a shift in threshold voltage (Vth). Therefore, it has become a prominent task for the industries to resolve the above problems of error actions which occur due to the existence of ambient white light.

SUMMARY OF THE INVENTION

According to one embodiment of the present invention, an optical sensing circuit is provided. The optical sensing circuit includes a capacitor, a light sensing unit, a compensation unit, and a switching element. The light sensing unit, electrically connected to the capacitor, includes a first light sensing transistor and is configured to sense a first color. The compensation unit, electrically connected to the capacitor, includes a second light sensing transistor and is configured to sense a second color. The spectrum of the second color and the spectrum of the first color do not overlap with each other. The switching element is electrically connected to the capacitor. When a light illuminates the light sensing unit and the compensation unit, a first light component of the light corresponding to the first color causes the light sensing unit to generate a first current, and a second light component of the light corresponding to the second color causes the compensation unit to generate a second current, the second current reduces the magnitude of the charging current or the discharging current when the capacitor is charged or discharged by the first current. When the switching element is turned on, the voltage of the capacitor is read and used as information for determining the color of the light. The voltage level of at least one of the gate of the first light sensing transistor and the gate of the second light sensing transistor is adjustable.

According to another embodiment of the present invention, an optical sensing circuit is provided. The optical sensing circuit includes a capacitor, a light sensing unit, a compensation unit, and a switching element. The light sensing unit, electrically connected to the capacitor, includes a first light sensing transistor and is configured to sense a first color. The compensation unit, electrically connected to the capacitor, includes a second light sensing transistor and is configured to sense a second color. The spectrum of the second color and the spectrum of the first color do not overlap with each other. The switching element is electrically connected to the capacitor. When a light illuminates the light sensing unit and the compensation unit, a first light component of the light corresponding to the first color causes the light sensing unit to generate a first current, and a second light component of the light corresponding to the second color causes the compensation unit to generate a second current, the second current reduces the magnitude of the charging current or the discharging current when the capacitor is charged or discharged by the first current. When the switching element is turned on, the voltage of the capacitor is read and used as information for determining the color of the light. The first light sensing transistor and the second light sensing transistor are diode-connected thin film transistors.

According to an alternate embodiment of the present invention, a method for determining light color using an optical sensing circuit is provided. The method includes the following steps. An optical sensing circuit, including a capacitor, a light sensing unit, a compensation unit, and a switching element, is provided. The light sensing unit, electrically connected to the capacitor, includes a first light sensing transistor and is configured to sense a first color. The compensation unit, electrically connected to the capacitor, includes a second light sensing transistor and is configured to sense a second color. The spectrum of the second color and the spectrum of the first color do not overlap with each other. The switching element is electrically connected to the capacitor. One end of the first light sensing transistor receives an operating signal. The switching element is controlled by a control signal. During an initial period, the operating signal has a first voltage for initializing the voltage value of the capacitor. During a sensing period, the operating signal has a second voltage. When the light illuminates the light sensing unit and the compensation unit, the first light component of the light corresponding to the first color causes the light sensing unit to generate a first current, and the second light component of the light corresponding to the second color causes the compensation unit to generate a second current. The second current reduces the magnitude of the charging current or the discharging current when the capacitor is charged or discharged by the first current. During a sampling period, the scan signal is enabled, such that the switching element is turned on and the voltage of the capacitor is read and used as information for determining the color of the light. The voltage level of at least one of the gate of the first light sensing transistor and the gate of the second light sensing transistor is adjustable.

According to another alternate embodiment of the present invention, a method for determining light color using an optical sensing circuit is provided. The method includes the following steps. An optical sensing circuit, including a capacitor, a light sensing unit, a compensation unit, and a switching element, is provided. The light sensing unit, electrically connected to the capacitor, includes a first light sensing transistor and is configured to sense a first color. The compensation unit, electrically connected to the capacitor, includes a second light sensing transistor and is configured to sense a second color. The spectrum of the second color and the spectrum of the first color do not overlap with each other. The switching element is electrically connected to the capacitor. One end of the first light sensing transistor receives an operating signal. The switching element is controlled by a control signal. During an initial period, the operating signal has a first voltage for initializing the voltage value of the capacitor. During a sensing period, the operating signal has a second voltage. When the light illuminates the light sensing unit and the compensation unit, the first light component of the light corresponding to the first color causes the light sensing unit to generate a first current, and the second light component of the light corresponding to the second color causes the compensation unit to generate a second current. The second current reduces the magnitude of the charging current or the discharging current when the capacitor is charged or discharged by the first current. During a sampling period, the scan signal is enabled, such that the switching element is turned on and the voltage of the capacitor is read and used as information for determining the color of the light. The first light sensing transistor and the second light sensing transistor are diode-connected thin film transistors.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
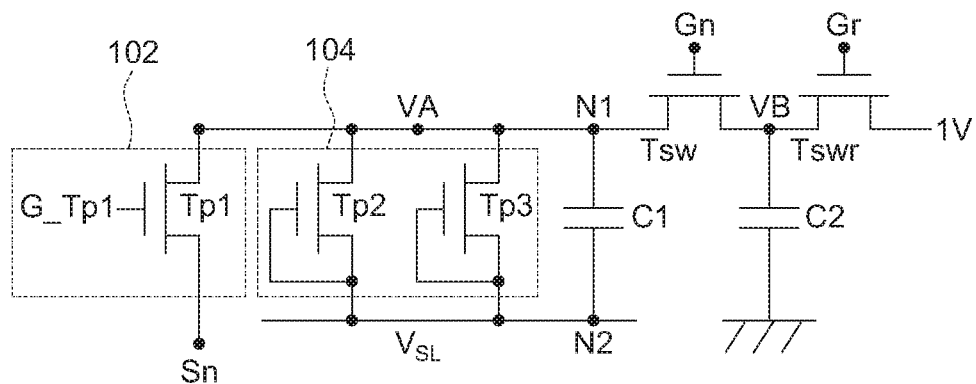
FIG. 1 is a circuit diagram of an optical sensing circuit according to an embodiment of the present disclosure.

Referring to FIG. 1, a circuit diagram of an optical sensing circuit according to an embodiment of the present disclosure is shown. The optical sensing circuit 100 includes a capacitor C1, a light sensing unit 102, a compensation unit 104, and a switching element Tsw. The light sensing unit 102, electrically connected to the capacitor C1, includes a first light sensing transistor Tp1 and is configured to sense a first color. The compensation unit 104, electrically connected to the capacitor C1, includes a second light sensing transistor Tp2 and is configured to sense a second color. The spectrum of the second color and the spectrum of the first color do not overlap with each other. The switching element Tsw is electrically connected to the capacitor C1.

When a light illuminates the light sensing unit 102 and the compensation unit 104, a first light component of the light corresponding to the first color causes the light sensing unit 102 to generate a first current, and a second light component of the light corresponding to the second color causes the compensation unit 104 to generate a second current. The second current reduces the magnitude of the charging current or the discharging current when the capacitor C1 is charged or discharged by the first current.

When the switching element Tsw is turned on, the voltage of the capacitor C1 is read and used as information for determining the color of the light.

The voltage level of at least one of the gate of the first light sensing transistor Tp1 and the gate of the second light sensing transistor Tp2 is adjustable. For example, the voltage level could be adjusted according to the intensity of an ambient light or the intensity of the light.

The compensation unit 104, under the illumination of a strong ambient light, such as an ambient white light, compensates the strong ambient light to reduce the influence of the strong ambient light on the voltage of the capacitor C1 and resolve the problem of error actions which occur due to the existence of the strong ambient light. Detailed descriptions are disclosed below.

The compensation unit 104 may further include a third light sensing transistor Tp3. The first light sensing transistor Tp1, the second light sensing transistor Tp2, and the third light sensing transistor Tp3 are respectively used to sense different colors. The first light sensing transistor Tp1, the second light sensing transistor Tp2, and the third light sensing transistor Tp3 could respectively be used to sense red, green, and blue colors, the first light sensing transistor Tp1, the second light sensing transistor Tp2, and the third light sensing transistor Tp3 could respectively be used to sense green, red, and blue colors, or the first light sensing transistor Tp1, the second light sensing transistor Tp2, and the third light sensing transistor Tp3 could respectively be used to sense blue, red, and green colors. Thus, the first color could be is, for example, the color sensed by the first light sensing transistor Tp1, and the second color could be, for example, the color sensed by the second light sensing transistor Tp2 or the third light sensing transistor Tp3, or the combination of the colors sensed by the second light sensing transistor Tp2 and the third light sensing transistor Tp3. In the following exemplification, the first light sensing transistor Tp1, the second light sensing transistor Tp2, and the third light sensing transistor Tp3 could respectively be used to sense red, green, and blue colors. Thus, the first color could be the color sensed by the first light sensing transistor Tp1, that is, red. The second color could be the color sensed by the second light sensing transistor Tp2 or the third light sensing transistor Tp3, that is, green or blue. Or, the second color could be the combination of the colors sensed by the second light sensing transistor Tp2 and the third light sensing transistor Tp3, that is, cyan being a combination of green and blue, for example.

The capacitor C1 has a first end N1 and a second end N2. The gate of the first light sensing transistor Tp1 is controlled by a first control signal G_Tp1. The second light sensing transistor Tp2 and the third light sensing transistor Tp3 are diode-connected thin film transistors. One end of the first light sensing transistor Tp1, one end of the second light sensing transistor Tp2, and one end of the third light sensing transistor Tp3 are electrically connected to the first end N1 of the capacitor C1. The other end and the gate of the second light sensing transistor Tp2 and the other end and the gate of the third light sensing transistor Tp3 are electrically connected to the second end N2 of the capacitor C1. The switching element Tsw is electrically connected to the first end N1 of the capacitor C1.

Figure 2A:
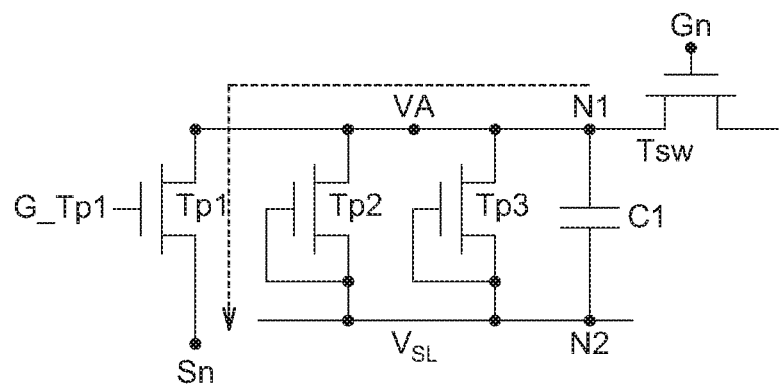
FIGS. 2A-2C illustrate the operations of the optical sensing circuit of FIG. 1.
Figure 2B:
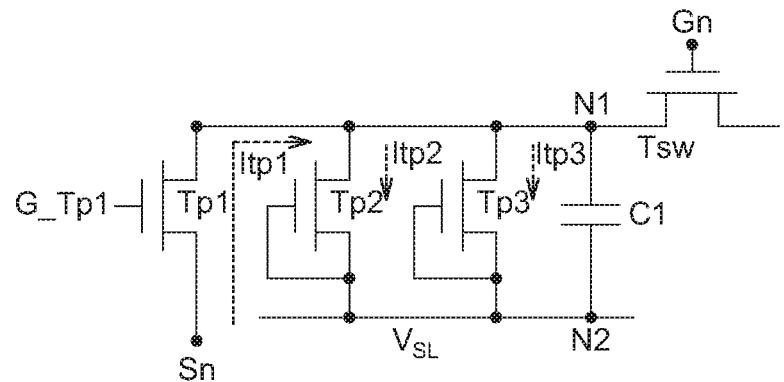
Figure 2C:
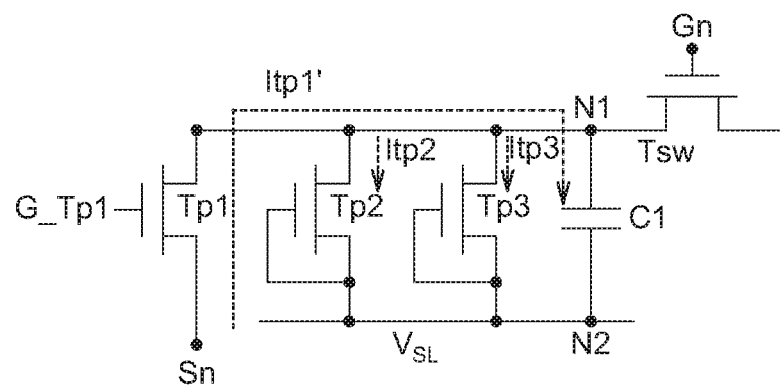
Figure 3:
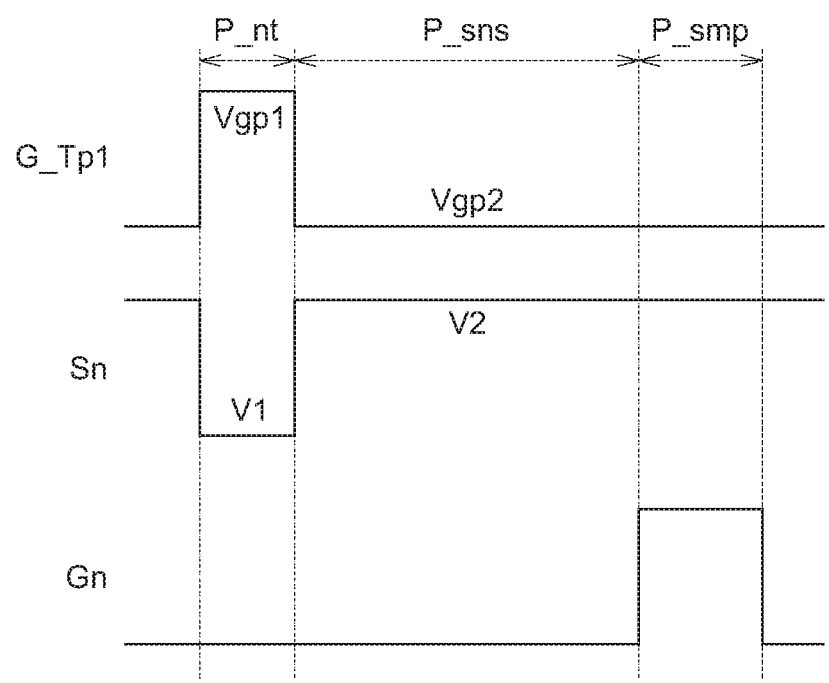
FIG. 3 is a waveform diagram of relevant signals of the optical sensing circuit of FIG. 1.

Refer to FIGS. 2A-2C, which illustrate the operations of the optical sensing circuit 100 of FIG. 1. Also, referring to FIG. 3, a waveform diagram of relevant signals of an optical sensing circuit 100 is shown. The other end of the first light sensing transistor Tp1 receives an operating signal Sn. The switching element Tsw is controlled by a scan signal Gn. As indicated in FIG. 3, during an initial period P_nt, the operating signal Sn has a first voltage V1 for initializing the voltage value of the capacitor C1. Let the optical sensing circuit 100 of FIG. 1 be a charge mode optical sensing circuit. As indicated in FIG. 2A, during the initial period P_nt, the first control signal G_Tp1 has a voltage Vgp1, and the operating signal Sn has a first voltage V1. At this time, the first light sensing transistor Tp1 is turned on (ON), and the capacitor C1 is discharged through the first light sensing transistor Tp1 to initialize the voltage of the capacitor C1.

During a sensing period P_sns, the operating signal Sn has a second voltage V2. When the light illuminates the light sensing unit 102 and the compensation unit 104, the first light component of the light corresponding to the first color causes the light sensing unit 102 to generate a first current, and the second light component of the light corresponding to the second color causes the compensation unit 104 to generate a second current. As indicated in FIG. 2B, during the sensing period P_sns, the first control signal G_Tp1 has a voltage Vgp2, which makes the first light sensing transistor Tp1 turned off (OFF). The operating signal Sn has a second voltage V2. At this time, when the light is a white light, the first light component (such as the red light component) of the white light corresponding to the first color (such as red) causes the light sensing unit 102 to generate a first current (such as current Itp1), and the second light component (such as the green light component, the blue light component, or the cyan light component) of the white light corresponding to the second color (such as green, blue, or cyan) causes the compensation unit 104 to generate a second current (such as current Itp2 and current Itp3). The red light component of the white light causes the first light sensing transistor Tp1 of the light sensing unit 102 to generate a current Itp1, the green light component of the white light causes the second light sensing transistor Tp2 of the compensation unit 104 to generate a current Itp2, and the blue light component of the white light causes the third light sensing transistor Tp3 of the compensation unit 104 to generate a current Itp3. Let Itp1=Itp2+Itp3. Thus, there will be no current flowing to the capacitor C1 to charge the capacitor C1.

During the sensing period P_sns, when the light with the first color (that is, an input light source exists) illuminates the light sensing unit 102 and the compensation unit 104, the first light component of the light corresponding to the first color causes the light sensing unit 102 to generate a first current. Since the light (that is, the input light source) does not have the second light component corresponding to the second color, the compensation unit 104 will not generate a second current. As indicated in FIG. 2C, when the light (the input light source) is a red light, the first light component (such as the red light component) of the red light (the red input light source) corresponding to the first color (such as red) causes the light sensing unit 102 to generate a first current (such as current Itp1'). Since the red light does not have the second light component (such as the green light component or the blue light component, or the cyan light component) corresponding to the second color (such as green or blue, or cyan), the compensation unit 104 may only have the second current (such as current Itp2 and current Itp3) generated by the ambient white light. The red light component of the red light causes the first light sensing transistor Tp1 of the light sensing unit 102 to generate a current Itp1', and the green light component of the white light causes the second light sensing transistor Tp2 of the compensation unit 104 to generate a current Itp2, the blue light component of the white light causes the third light sensing transistor Tp3 of the compensation unit 104 to generate a current Itp3. Since the red light component of the red light is greater than the red light component of the ambient white light, the generated current Itp1' will be far greater than the current Itp1, that is, Itp1'>>Itp1, and Itp1'>>Itp2+Itp3. Thus, there will be some current flowing to the capacitor C1 to charge the capacitor C1.

Then, during a sampling period P_smp, the scan signal Gn is enabled, such that the switching element Tsw is turned on and the voltage of the capacitor C1 is read. For example, under the circumstance that the scan signal Gn is enabled, the switching element Tsw is turned on, and the voltage of the first end N1 of the capacitor C1 is read, the control circuit (not shown) therefore could determine whether the light illuminates the optical sensing circuit 100 according to the voltage read by the control circuit 100.

Refer to FIG. 1 again. The optical sensing circuit 100 may optionally include a capacitor C2 and a switching element Tswr. The capacitor C2 is coupled to the node between the switching element Tsw and the switching element Tswr. The switching element Tswr is controlled by the read signal Gr. When the scan signal Gn is enabled, the charges of the capacitor C1 and the capacitor C2 are re-distributed. When the read signal Gr is enabled, the voltage of the capacitor C2 is read. The read value of the voltage VB of the capacitor C2 is relevant with the voltage value of the capacitor C1 before the switching element Tsw is turned on. Detailed descriptions of the present disclosure are further disclosed below with a number of simulated waveform diagrams of relevant signals of the optical sensing circuit.

Figure 4:
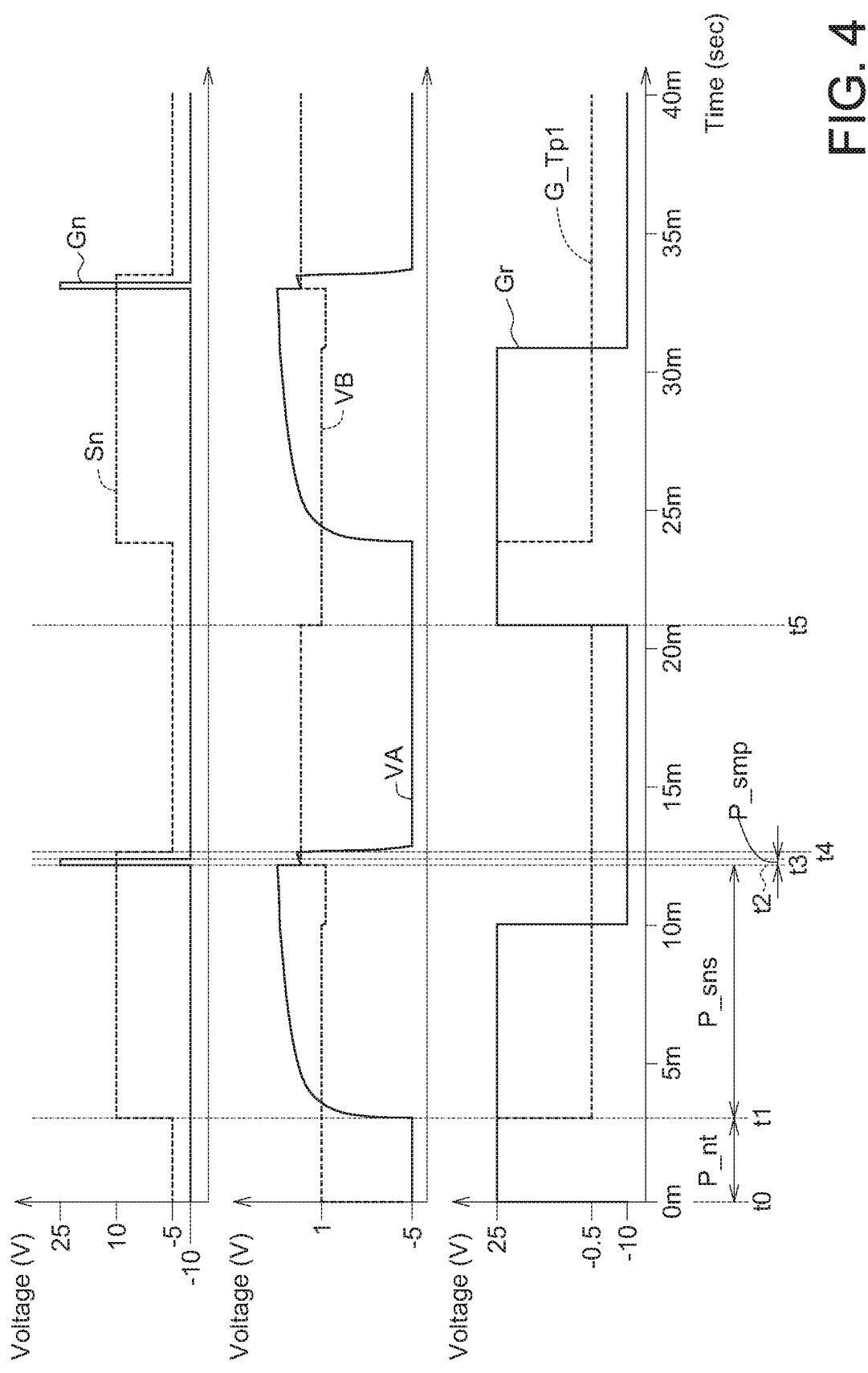
FIG. 4 is an example of a simulated waveform diagram of relevant signals of the optical sensing circuit of FIG. 1 under the circumstances that the ambient light is 2000 lux and a red input light source exists.

Referring to FIG. 4, an example of a simulated waveform diagram of relevant signals of the optical sensing circuit 100 of FIG. 1 under the circumstances that the ambient light is 2000 lux and a red input light source exists is shown. In the present example, the first to the third light sensing transistors Tp1~Tp3 each has a size (W/L) of 20 μm/8 μm; the capacitance of the capacitor C1 is 0.8 pf; the first voltage V1 (low voltage) of the operating signal Sn is −5V; the second voltage V2 (high voltage) of the operating signal Sn is 10V; the voltage $V_{SL}$ of the second end N2 of the capacitor C1 is −5V; the voltage Vgp1 (high voltage) and the voltage Vgp2 (low voltage) of the first control signal G_Tp1 respectively are 25V and −0.5V; the enable voltage of the scan signal Gn is 25V; the non-enable voltage is −10V. During the initial period P_nt between time points t0 and t1, the operating signal Sn has a first voltage V1 (such as −5V) for initializing the voltage value of the capacitor C1. For example, the voltage VA of the capacitor C1 is initialized as −5V. During the sensing period P_sns between time points t1 and t2, the operating signal Sn has a second voltage V2 (10V). When the light illuminates the light sensing unit 102 and the compensation unit 104, the capacitor C1 is charged. For example, the voltage VA of the capacitor C1 is charged to about 4V. During the sampling period P_smp between times points t2 and t3, the scan signal Gn is enabled (such as changes to 25V), such that the switching element Tsw is turned on, and the voltages of the capacitors C1 and C2 will be adjusted to be almost identical to each other (such as about 2.56V). At time point t4, the optical sensing circuit again enters the initial period P_nt. At this time, the operating signal Sn again changes to have the first voltage V1 (such as −5V) for initializing the voltage value of the capacitor C1. For example, the voltage VA of the capacitor C1 again is initialized as −5V. At time point t5, the read signal Gr changes to be enabled (such as changes to 25V), such that the voltage of the capacitor C2 could be read. The read voltage value of the capacitor C2 is the voltage value read at the time point t2 after the charges of the capacitor C1 are re-distributed to the capacitors C1 and C2. The read voltage value of the capacitor C2 is, for example, 2.56V. When the read voltage value of the capacitor C2 is larger than a threshold, it could be determined that the light (corresponding to the color sensed by the light sensing unit 102, such as red) illuminates the optical sensing circuit 100. That is, an input light source exists.

Figure 5:
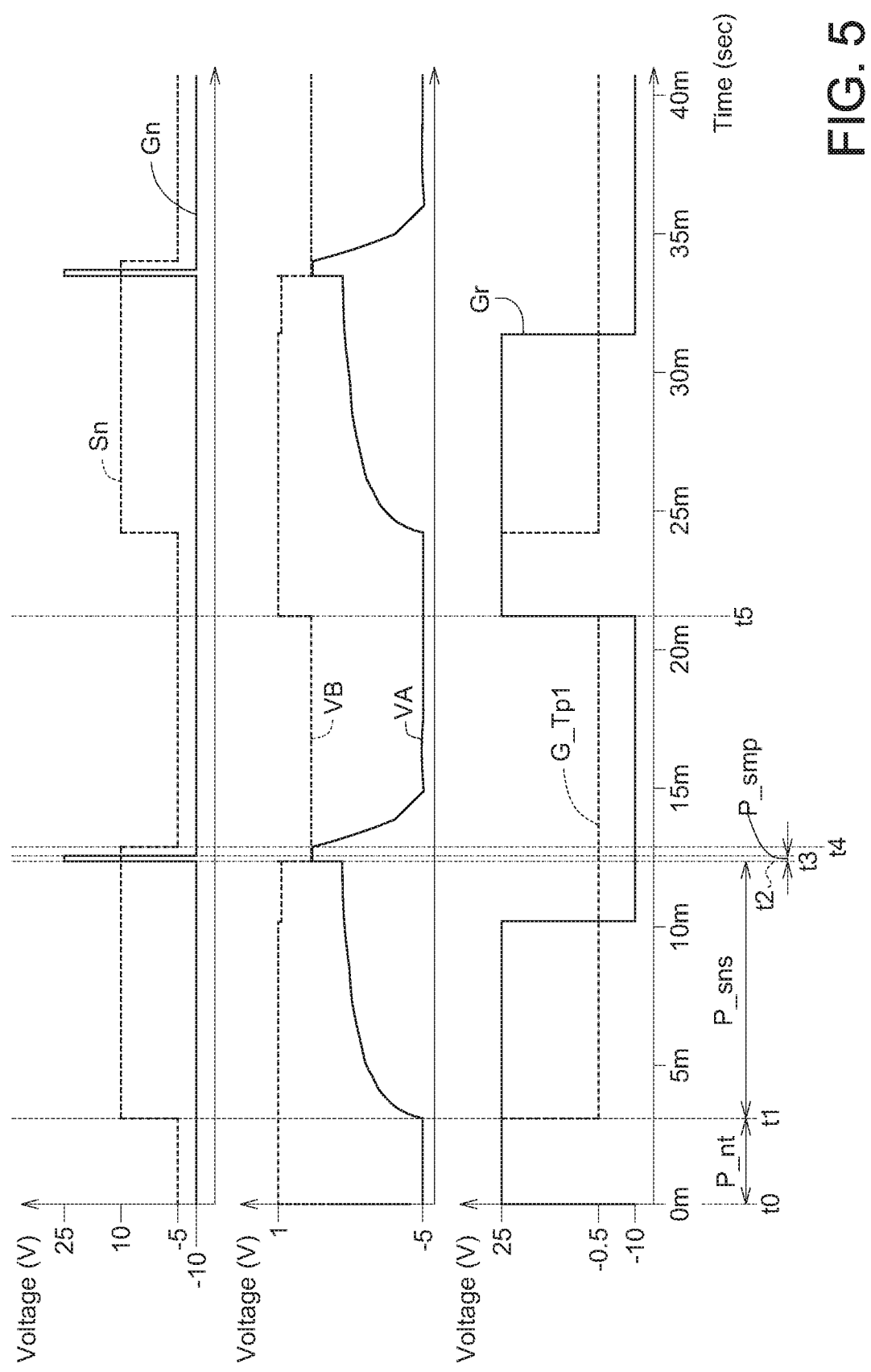
FIG. 5 is an example of a simulated waveform diagram of relevant signals of the optical sensing circuit of FIG. 1 under the circumstances that the ambient light is 2000 lux, and the input light source does not exists.

Referring to FIG. 5, an example of a simulated waveform diagram of relevant signals of the optical sensing circuit 100 of FIG. 1 under the circumstances that the ambient light is 2000 lux, and the input light source does not exists is shown. Unlike FIG. 4, since only the ambient light illuminates the light sensing unit 102 and the compensation unit 104, the capacitor C1 is charged by a current obtained by deducting the second current generated by the compensation unit 104 from the first current generated by the light sensing unit 102. For example, the voltage VA of the capacitor C1 is charged to about −1.5V. At time point t2, the scan signal Gn is enabled (such as changes to 25V), such that after the switching element Tsw is turned on, the voltages of the capacitors C1 and C2 will be adjusted to be almost identical to each other (such as about −0.22V). At time point t5, the read signal Gr is enabled (such as changes to 25V), such that the voltage of the capacitor C2 could be read. The read voltage value of the capacitor C2 is the voltage value read at time point t2 after the charges of the capacitor C1 are re-distributed to the capacitors C1 and C2. The read voltage value of the capacitor C2 is, for example, −0.22V. When the read voltage value of the capacitor C2 is smaller than a threshold, it could be determined that no light corresponding to the color sensed by the light sensing unit 102 (such as red) illuminates the optical sensing circuit 100, that is, it is determined that the input light source does not exist.

Figure 6:
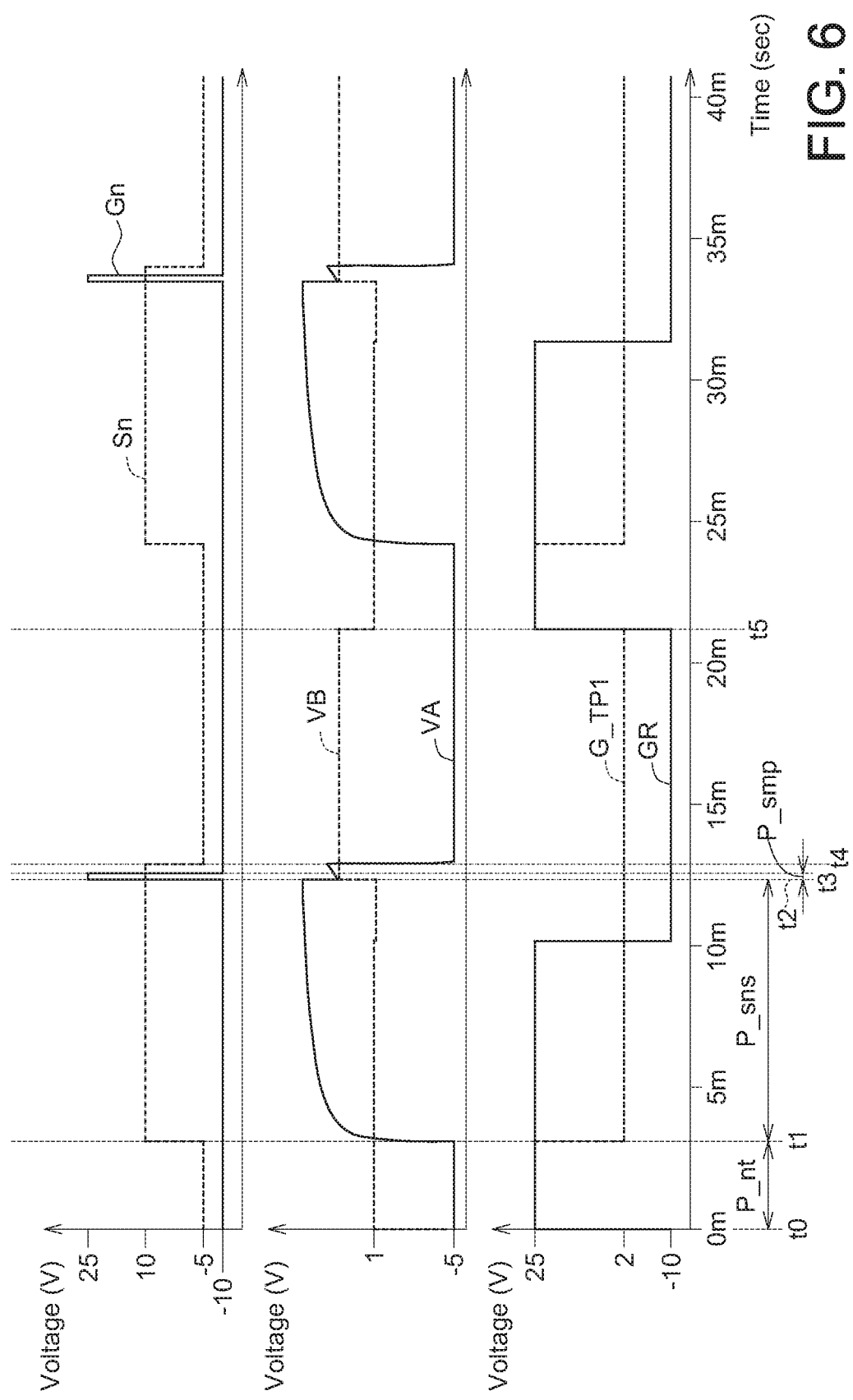
FIG. 6 is an example of a simulated waveform diagram of relevant signals of the optical sensing circuit of FIG. 1 under the circumstances that the low level voltage of the first control signal G_Tp1 is set as 2V, the ambient light is 2000 lux, and the input light source exists.

Referring to FIG. 6, an example of a simulated waveform diagram of relevant signals of the optical sensing circuit 100 of FIG. 1 under the circumstances that the low level voltage of the first the control signal G_Tp1 is set as 2V, the ambient light is 2000 lux, and the input light source exists is shown. Unlike FIG. 4, under the circumstance that the input light source exists, during the sensing period P_sns between time points t1 and t2, the higher low level voltage of the first control signal G_Tp1 (2V) causes the voltage of the capacitor C1 to be more quickly charged to a higher voltage. Thus, by increasing the low level voltage of the first control signal G_Tp1 (2V), the charging rate of the capacitor C1 will be increased and the length of the sensing period P_sns could even be shortened. Moreover, when the input light source has a lower intensity, by increasing the low level voltage of the first control signal G_Tp1, the input light source with lower intensity could be more easily detected.

Figure 7:
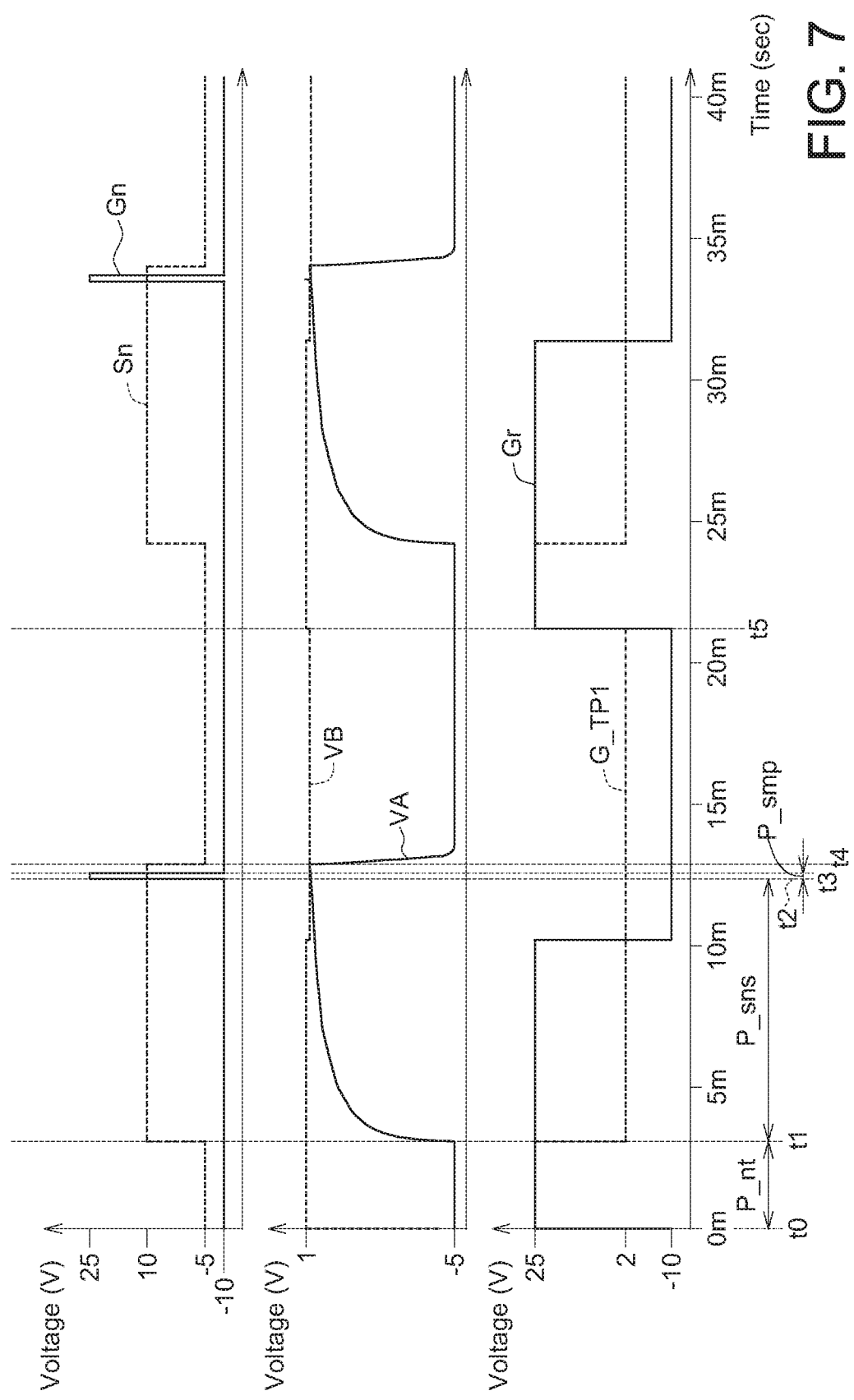
FIG. 7 is an example of a simulated waveform diagram of relevant signals of the optical sensing circuit of FIG. 1 under the circumstances that the low level voltage of the first control signal G_Tp1 is set as 2V, the ambient light is 2000 lux, and the input light source does not exist.

Referring to FIG. 7, an example of a simulated waveform diagram of relevant signals of the optical sensing circuit 100 of FIG. 1 under the circumstances that the low level voltage of the first the control signal G_Tp1 is set as 2V, the ambient light is 2000 lux, and the input light source does not exist is shown. Unlike FIG. 5, under the circumstance that the input light source does not exist, during the sensing period P_sns between time points t1 and t2, the higher low level voltage of the first control signal G_Tp1 (2V) will also cause the voltage of the capacitor C1 to be more quickly charged to a higher voltage. As long as the magnitude of the low level voltage of the first control signal G_Tp1 (2V) could be properly controlled, the problem of the capacitor C1 being over-charged in the absence of the input light source could be avoided.

Figure 8:
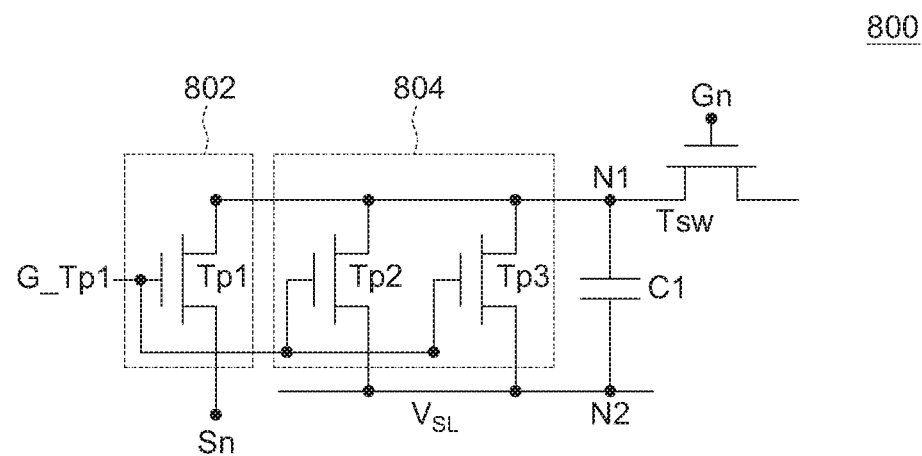
FIG. 8 is a circuit diagram of an optical sensing circuit according to another embodiment of the present disclosure.

Referring to FIG. 8, a circuit diagram of an optical sensing circuit 800 according to another embodiment of the present disclosure is shown. The differences between the optical sensing circuit 800 and the optical sensing circuit 100 are disclosed below. The optical sensing circuit 800 includes a capacitor C1, a light sensing unit 802, a compensation unit 804, and a switching element Tsw. The light sensing unit 802 includes a first light sensing transistor Tp1. The compensation unit 804 includes a second light sensing transistor Tp2 and a third light sensing transistor Tp3. The capacitor C1 has a first end N1 and a second end N2. The gate of the first light sensing transistor Tp1, the gate of the second light sensing transistor Tp2, and the gate of the third light sensing transistor Tp3 are controlled by a first control signal G_Tp1. One end of the first light sensing transistor Tp1, one end of the second light sensing transistor Tp2, and one end of the third light sensing transistor Tp3 are electrically connected to the first end N1 of the capacitor C1. The other end of the second light sensing transistor Tp2 and the other end of the third light sensing transistor Tp3 are electrically connected to the second end N2 of the capacitor C1. The switching element Tsw is electrically connected to the first end N1 of the capacitor C1.

Figure 9:
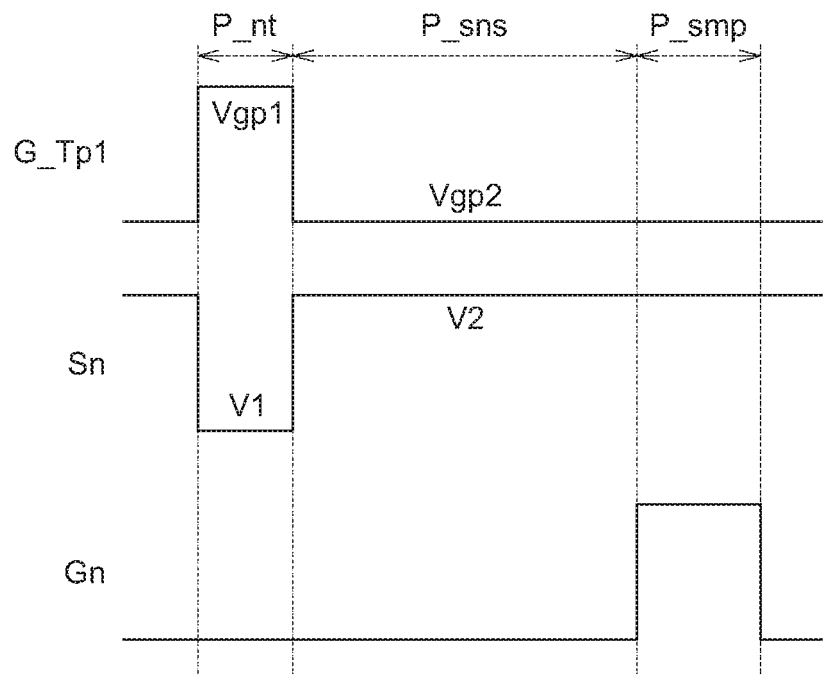
FIG. 9 is a waveform diagram of relevant signals of the optical sensing circuit of FIG. 8.

Referring to FIG. 9, a waveform diagram of relevant signals of the optical sensing circuit 800 of FIG. 8 is shown. The other end of the first light sensing transistor Tp1 receives an operating signal Sn. The switching element Tsw is controlled by a scan signal Gn. As indicated in FIG. 9, during the initial period P_nt, the operating signal Sn has a first voltage V1, and the first control signal G_Tp1 has a voltage Vgp1 for initializing the voltage value of the capacitor C1. During the sensing period P_sns, the operating signal Sn has a second voltage V2, and the first control signal G_Tp1 has a voltage Vgp2. When the light illuminates the light sensing unit 802 and the compensation unit 804, the first light component of the light corresponding to the first color causes the light sensing unit 802 to generate a first current, and the second light component of the light corresponding to the second color causes the compensation unit 804 to generate a second current. Then, during the sampling period P_smp, the scan signal Gn is enabled, the switching element Tsw is turned on, the voltage of the capacitor C1 is read, and whether the light illuminates the optical sensing circuit 800 is determined according to the read value of the voltage.

Figure 10:
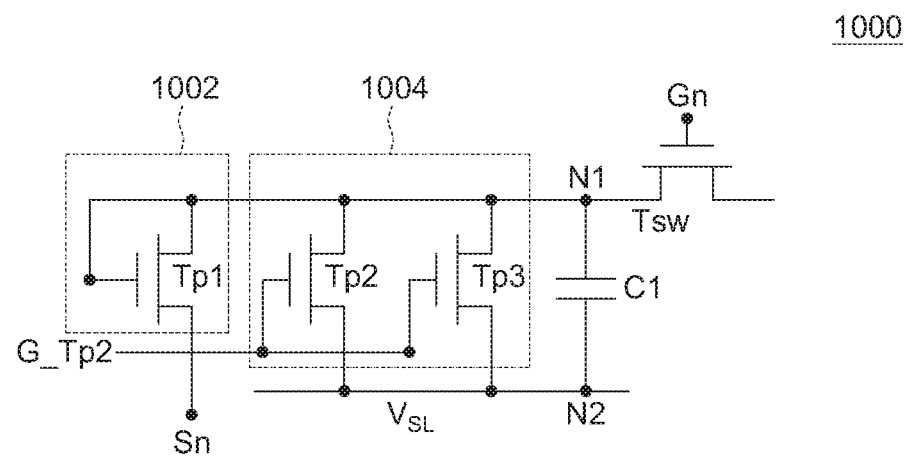
FIG. 10 is a circuit diagram of an optical sensing circuit according to another embodiment of the present disclosure.

Referring to FIG. 10, a circuit diagram of an optical sensing circuit 1000 according to another embodiment of the present disclosure is shown. The differences between the optical sensing circuit 1000 and the optical sensing circuit 100 are disclosed below. The optical sensing circuit 1000 includes a capacitor C1, a light sensing unit 1002, a compensation unit 1004, and a switching element Tsw. The light sensing unit 1002 includes a first light sensing transistor Tp1. The compensation unit 1004 includes a second light sensing transistor Tp2 and a third light sensing transistor Tp3. The capacitor C1 has a first end N1 and a second end N2. The gate of the second light sensing transistor Tp2 and the gate of the third light sensing transistor Tp3 are controlled by a second control signal G_Tp2. The first light sensing transistor Tp1 is a diode-connected thin film transistor. One end and the gate of the first light sensing transistor Tp1, one end of the second light sensing transistor Tp2, and one end of the third light sensing transistor Tp3 are electrically connected to the first end N1 of the capacitor C1. The other end of the second light sensing transistor Tp2 and the other end of the third light sensing transistor Tp3 are electrically connected to the second end N2 of the capacitor C1. The switching element Tsw is electrically connected to the first end N1 of the capacitor C1.

Figure 11:
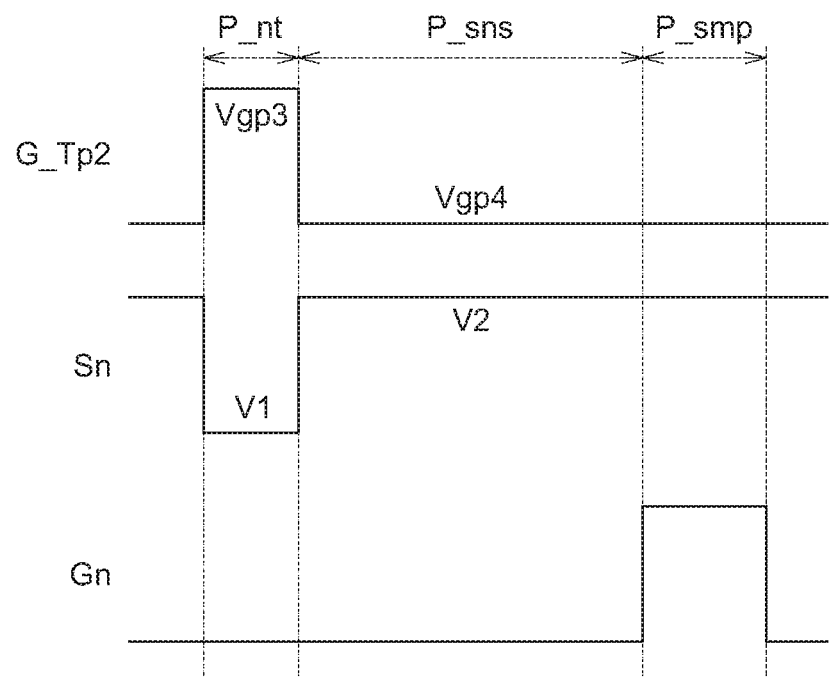
FIG. 11 is a waveform diagram of relevant signals of the optical sensing circuit of FIG. 10.

Referring to FIG. 11, a waveform diagram of relevant signals of the optical sensing circuit 1000 of FIG. 10 is shown. The other end of the first light sensing transistor Tp1 receives an operating signal Sn. The switching element Tsw is controlled by a scan signal Gn. As indicated in FIG. 11, during the initial period P_nt, the operating signal Sn has a first voltage V1, and the second control signal G_Tp2 has a voltage Vgp3 for initializing the voltage value of the capacitor C1. During the sensing period P_sns, the operating signal Sn has a second voltage V2, and the second control signal G_Tp2 has a voltage Vgp4. When the light illuminates the light sensing unit 1002 and the compensation unit 1004, the first light component of the light corresponding to the first color causes the light sensing unit 1002 to generate a first current, and the second light component of the light corresponding to the second color causes the compensation unit 1004 to generate a second current. Then, during the sampling period P_smp, the scan signal Gn is enabled, such that the switching element Tsw is turned on, the voltage of the capacitor C1 is read, and whether the light illuminates the optical sensing circuit 1000 is determined according to the read value of the voltage.

Figure 12:
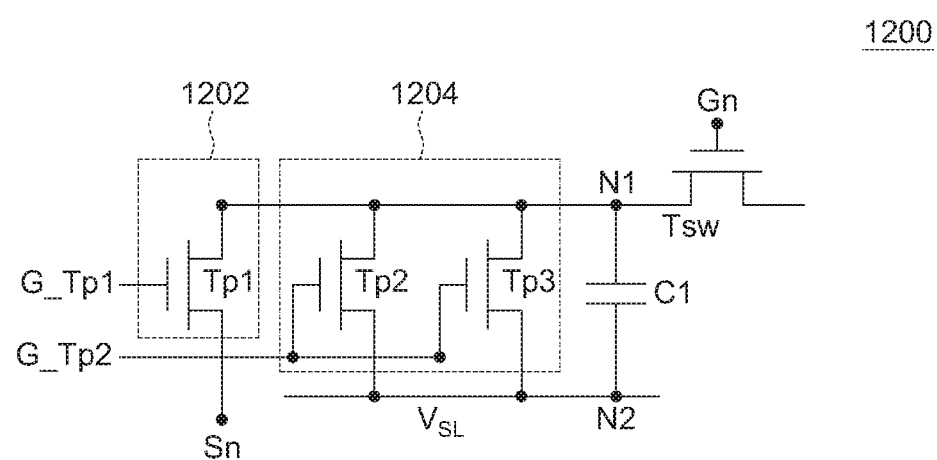
FIG. 12 is a circuit diagram of an optical sensing circuit according to another embodiment of the present disclosure.

Referring to FIG. 12, a circuit diagram of an optical sensing circuit 1200 according to another embodiment of the present disclosure is shown. The differences between the optical sensing circuit 1200 and the optical sensing circuit 100 are disclosed below. The optical sensing circuit 1200 includes a capacitor C1, a light sensing unit 1202, a compensation unit 1204, and a switching element Tsw. The light sensing unit 1202 includes a first light sensing transistor Tp1. The compensation unit 1204 includes a second light sensing transistor Tp2 and a third light sensing transistor Tp3. The capacitor C1 has a first end N1 and a second end N2. The gate of the first light sensing transistor Tp1 is controlled by a first control signal G_Tp1. The gate of the second light sensing transistor Tp2 and the gate of the third light sensing transistor Tp3 are controlled by a second control signal G_Tp2. One end of the first light sensing transistor Tp1, one end of the second light sensing transistor Tp2, and one end of the third light sensing transistor Tp3 are electrically connected to the first end N1 of the capacitor C1. The other end of the second light sensing transistor Tp2 and the other end of the third light sensing transistor Tp3 are electrically connected to the second end N2 of the capacitor C1. The switching element Tsw is electrically connected to the first end N1 of the capacitor C1.

Figure 13:
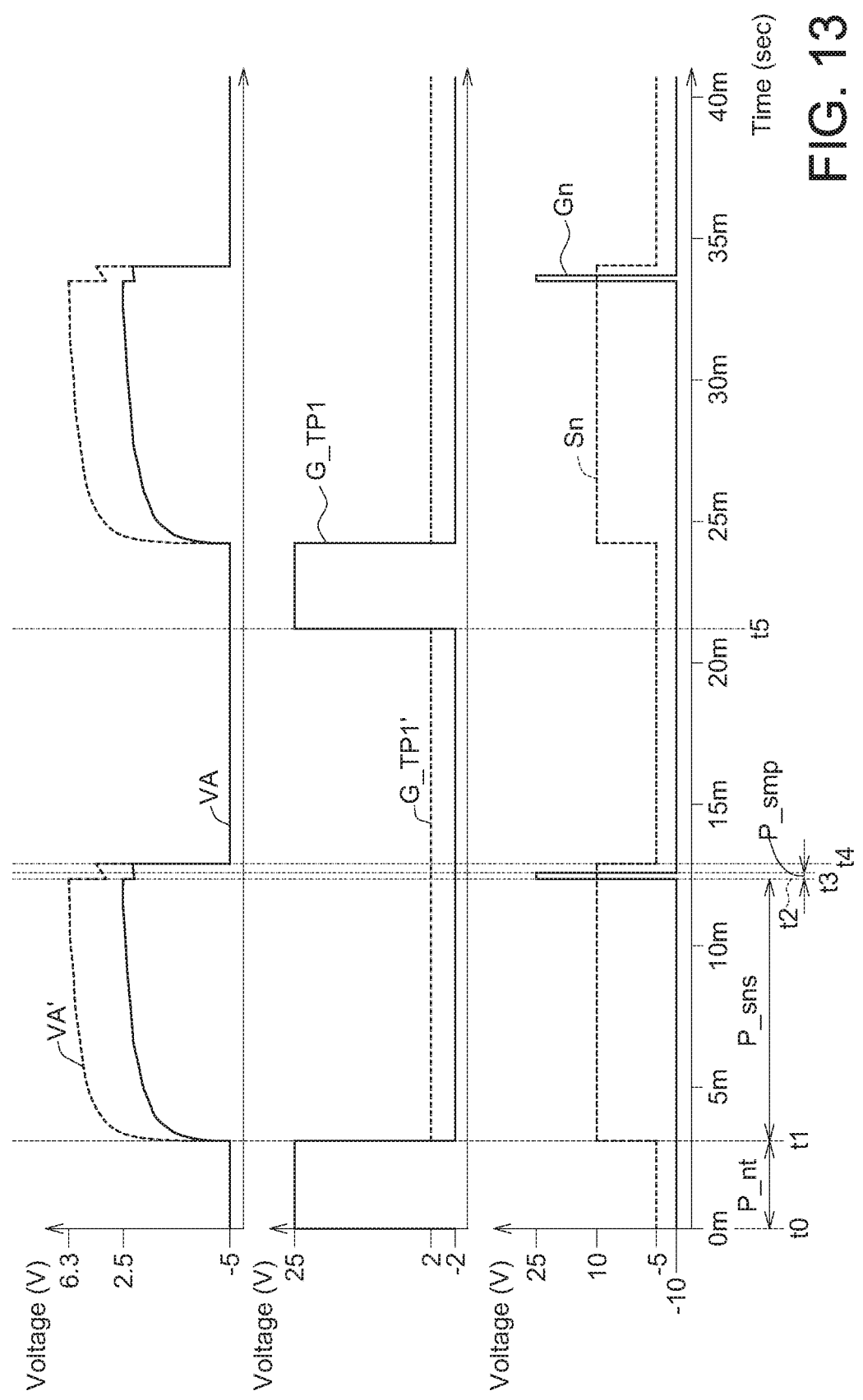
FIG. 13 is an example of a simulated waveform diagram of relevant signals of the optical sensing circuit of FIG. 12 under the circumstances that the ambient light is 2000 lux and a red input light source exists.

Referring to FIG. 13, an example of a simulated waveform diagram of relevant signals of the optical sensing circuit 1200 of FIG. 12 under the circumstances that the ambient light is 2000 lux and a red input light source exists is shown. In the present example, the first to the third light sensing transistor Tp1~Tp3 each has a size (W/L) of 20 μm/8 μm; the capacitance of the capacitor C1 is 0.8 pf; the first voltage V1 (low voltage) of the operating signal Sn is −5V; the second voltage V2 (high voltage) of the operating signal Sn is 10V; the voltage $V_{SL}$ of the second end N2 of the capacitor C1 is −5V; the high voltage and the low voltage of the scan signal Gn respective are 25V and −10V. During the initial period P_nt between time points t0 and t1, the operating signal Sn has a first voltage V1 (such as −5V), and the first control signal G_Tp1, for example, has voltage 25V for initializing the voltage value of the capacitor C1. For example, the voltage VA of the capacitor C1 is initialized as −5V. During the sensing period P_sns between time points t1 and t2, the operating signal Sn has a second voltage V2 (10V), and the first control signal G_Tp1 has a voltage of −2V. When the light illuminates the light sensing unit 1202 and the compensation unit 1204, the capacitor C1 is charged. For example, the voltage VA of the capacitor C1 is charged to about 2.5V. During the sampling period P_smp between time points t2 and t3, the scan signal Gn is enabled (such as changes to 25V), such that the switching element Tsw is turned on, and the voltage of the capacitor C1 is sampled.

In the present example, the voltage value of the low voltage of the first control signal G_Tp1 is adjustable. When the voltage value of the low voltage of the first control signal G_Tp1 is increased, during the sensing period P_sns between time points t1 and t2, the voltage VA by which the capacitor C1 is charged when the light illuminates the light sensing unit 1202 and the compensation unit 1204 will be increased correspondingly. As indicated in FIG. 13, during the sensing period P_sns, when the voltage value of the low voltage of the first control signal G_Tp1' is increased to 2V, the voltage VA' of the capacitor C1 will be charged to about 6.3V.

By increasing the voltage value of the low voltage of the first control signal G_Tp1, the effect of compensating for the input light source with lower intensity can be achieved. By increasing the voltage value of the first control signal G_Tp1, the magnitude of the light leakage current of the first light sensing transistor Tp1 illuminated by the light could be adjusted, such that the magnitude of the current by which the capacitor C1 is charged during the sensing period P_sns could be increased. Thus, when the intensity of the input light source is too low, larger magnitude of the light leakage current of the first light sensing transistor Tp1 could be generated by increasing the voltage value of the first control signal G_Tp1, such that the magnitude of the current generated by the input light source with lower intensity for charging the capacitor C1 could be increased, and the input light source with lower intensity still could be detected by the optical sensing circuit 1200.

Figure 14:
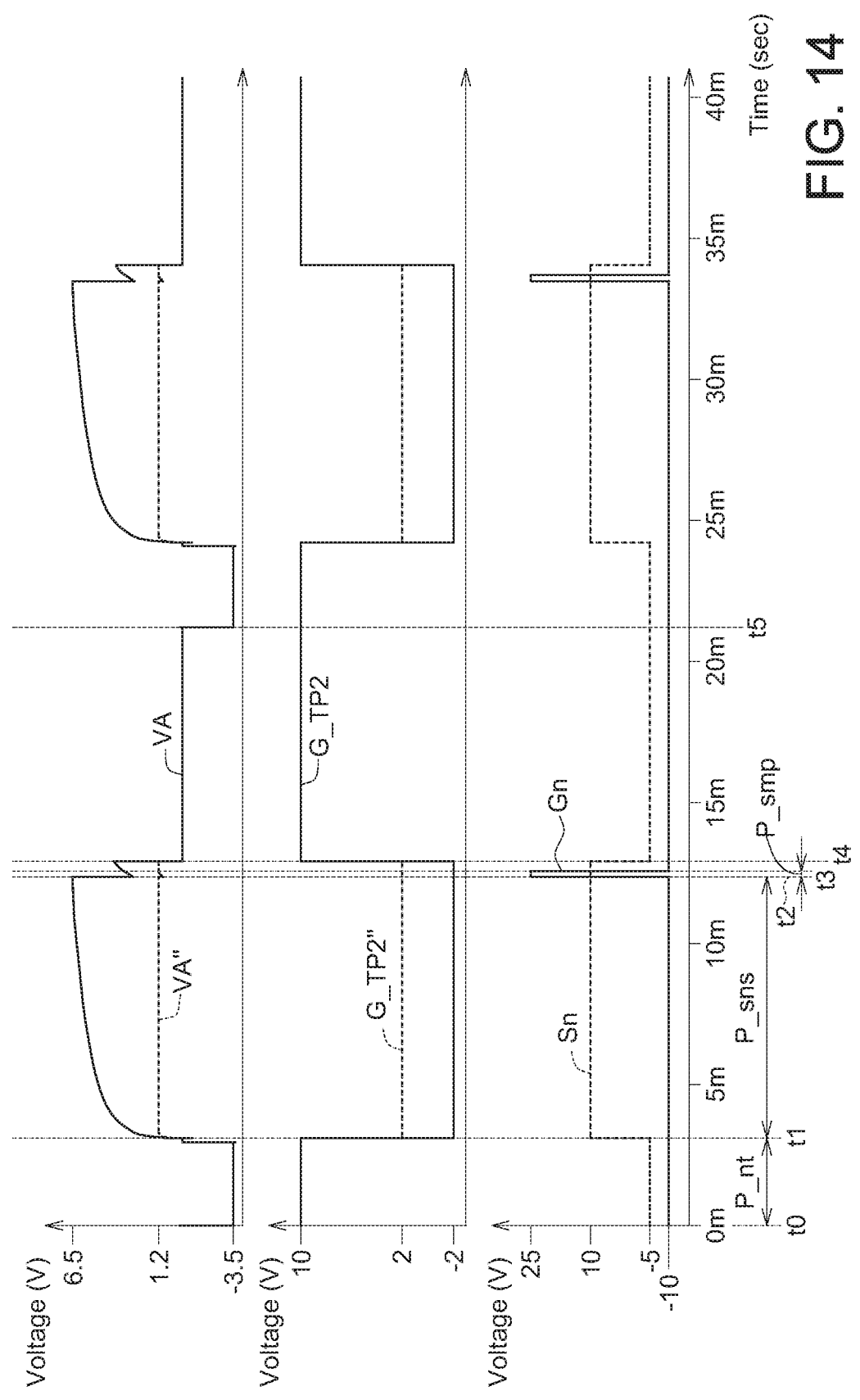
FIG. 14 is another example of a simulated waveform diagram of relevant signals of the optical sensing circuit of FIG. 12 under the circumstances that the ambient light is 2000 lux and a red input light source exists.

Referring to FIG. 14, another example of a simulated waveform diagram of relevant signals of the optical sensing circuit 1200 of FIG. 12 under the circumstances that the ambient light is 2000 lux and a red input light source exists is shown. Unlike FIG. 13, FIG. 14 illustrates the waveform diagram obtained after the second control signal G_Tp2 is adjusted. During the initial period P_nt between time points t0 and t1, the operating signal Sn has a first voltage V1 (such as −5V) for initializing the voltage value of the capacitor C1. For example, the voltage VA of the capacitor C1 is initialized as −5V. During the sensing period P_sns between time points t1 and t2, the operating signal Sn has a second voltage V2 (10V), and the second control signal G_Tp2 has a voltage of −2V. When the light illuminates the light sensing unit 1202 and the compensation unit 1204, the capacitor C1 is charged. For example, the voltage VA of the capacitor C1 is charged to about 6.5V. During the sampling period P_smp between time points t2 and t3, the scan signal Gn is enabled (such as changes to 25V), such that the switching element Tsw is turned on, and the voltage of the capacitor C1 is sampled.

In the present example, the voltage value of the low voltage of the second control signal G_Tp2 is adjustable. When the voltage value of the low voltage of the second control signal G_Tp2 is increased, during the sensing period P_sns between time points t1 and t2, the voltage VA by which the capacitor C1 is charged when the light illuminates the light sensing unit 1202 and the compensation unit 1204 will be decreased correspondingly. For example, as indicated in FIG. 14, when the voltage value of the low voltage of the second control signal G_Tp2" is increased to 2V, the voltage VA" of the capacitor C1 will be charged to about 1.2V, which is lower than the voltage VA (6.5V) of the capacitor C1 when the voltage value of the low voltage of the second control signal G_Tp2 is −2V.

By increasing the voltage value of the low voltage of the second control signal G_Tp2", the effect of decreasing the influence of the ambient light or enhancing the input light source with lower intensity could be achieved. By adjusting the voltage value of the second control signal G_Tp2, the magnitude of the light leakage current of the second light sensing transistor Tp2 and the third light sensing transistor Tp3 illuminated by the light could be adjusted, such that the magnitude of the current by which the capacitor C1 is charged could be decreased during the sensing period P_sns. For example, under the circumstances that the input light source has a lower intensity and the ambient light source has a higher intensity, the original voltage value of the second control signal G_Tp2 (before adjustment) may cause the second light sensing transistor Tp2 and the third light sensing transistor Tp3 to generate a larger compensation current, and no current will flow to the capacitor C1 to charge the capacitor C1. At this time, by decreasing the voltage value of the low voltage of the second control signal G_Tp2, the magnitudes of compensation currents generated by the second light sensing transistor Tp2 and the third light sensing transistor Tp3 will be effectively decreased, and the input light source still could be detected by the optical sensing circuit even under the circumstances that the input light source has a lower intensity and the ambient light source has a higher intensity. Besides, under the circumstances that the input light source does not exist and that the ambient light source has a higher intensity, during the sensing period P_sns, the optical sensing circuit 1200 still may generate error actions when the compensation currents generated by the second light sensing transistor Tp2 and the third light sensing transistor Tp3 cannot completely compensate the light leakage current of the first light sensing transistor Tp1 generated by the strong ambient light and when the capacitor C1 is charged by the light leakage current generated by the first light sensing transistor Tp1. At this time, by increasing the voltage value of the low voltage of the second control signal G_Tp2, the compensation currents generated by the second light sensing transistor Tp2 and the third light sensing transistor Tp3 could be increased to compensate the light leakage current generated by the first light sensing transistor Tp1 and reduce the magnitude of the current flowing to the capacitor C1 and reduce the amount of charging for the capacitor C1. Thus, by boosting the voltage value of the low voltage of the second control signal G_Tp2, under the circumstances that the input light source does not exist and that the ambient light source has a higher intensity, a current flow to the capacitor C1 and charge the capacitor C1 can be avoided and the error action of error charging the capacitor C1 could be avoided.

Figure 15:
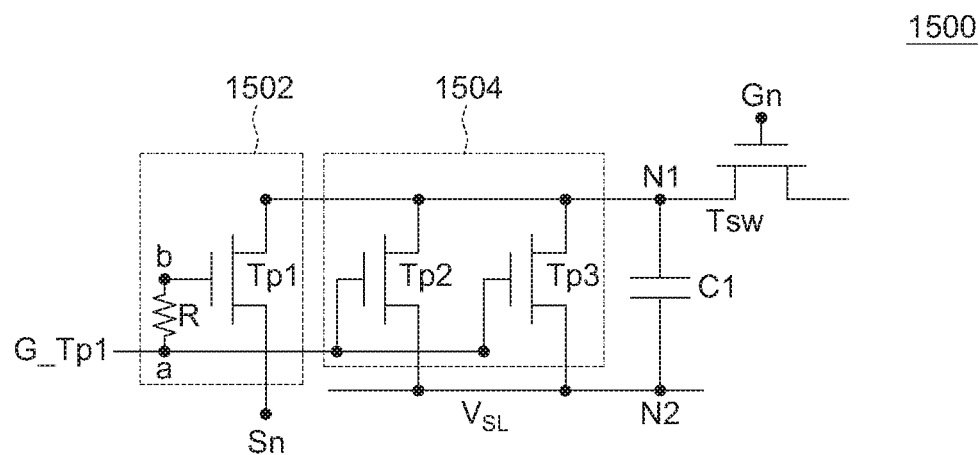
FIG. 15 is a circuit diagram of an optical sensing circuit according to another embodiment of the present disclosure.

Referring to FIG. 15, a circuit diagram of an optical sensing circuit 1500 according to another embodiment of the present disclosure is shown. The differences between the optical sensing circuit 1500 and the optical sensing circuit 100 are disclosed below. The optical sensing circuit 1500 includes a capacitor C1, a light sensing unit 1502, a compensation unit 1504, and a switching element Tsw. The light sensing unit 1502 includes a first light sensing transistor Tp1. The compensation unit 1504 includes a second light sensing transistor Tp2 and a third light sensing transistor Tp3. The capacitor C1 has a first end N1 and a second end N2. The gate of the second light sensing transistor Tp2 and the gate of the third light sensing transistor Tp3 are controlled by a first control signal G_Tp1. The gate of the first light sensing transistor Tp1 receives the first control signal G_Tp1 through a bias resistor R. One end of the first light sensing transistor Tp1, one end of the second light sensing transistor Tp2, and one end of the third light sensing transistor Tp3 are electrically connected to the first end N1 of the capacitor C1. The other end of the second light sensing transistor Tp2 and the other end of the third light sensing transistor Tp3 are electrically connected to the second end N2 of the capacitor C1. The switching element Tsw is electrically connected to the first end N1 of the capacitor C1.

By using the bias resistor R, the voltages of the gate of the first light sensing transistor Tp1, the gate of the second light sensing transistor Tp2 and the gate of the third light sensing transistor Tp3 can be adjusted at the same time through a control signal (such as the first control signal G_Tp1) only.

Figure 16:
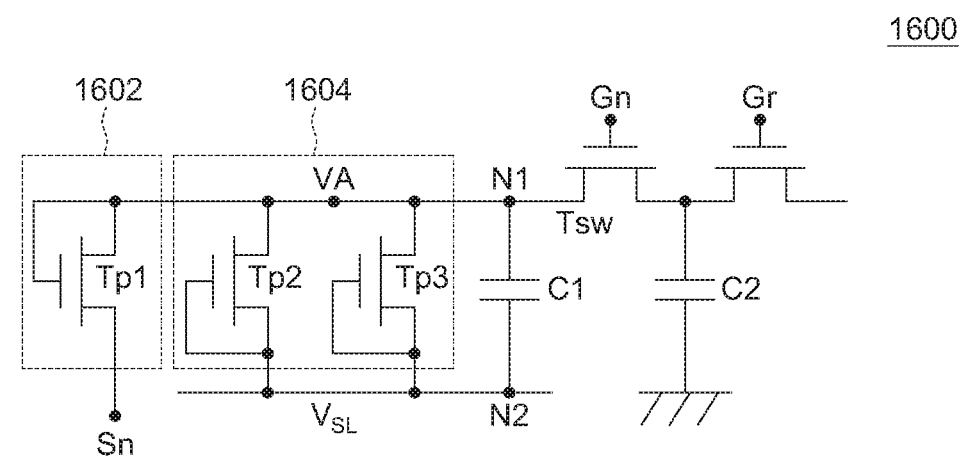
FIG. 16 is a circuit diagram of an optical sensing circuit according to another embodiment of the present disclosure.

Referring to FIG. 16, a circuit diagram of an optical sensing circuit 1600 according to another embodiment of the present disclosure is shown. The optical sensing circuit 1600 includes a capacitor C1, a light sensing unit 1602, a compensation unit 1604, and a switching element Tsw. The light sensing unit 1602, electrically connected to the capacitor C1, includes a first light sensing transistor Tp1 and is configured to sense a first color. The compensation unit 1604, electrically connected to the capacitor C1, includes a second light sensing transistor Tp2 and is configured to sense a second color. The spectrum of the second color and the spectrum of the first color do not overlap with each other. The switching element Tsw is electrically connected to the capacitor C1. When a light illuminates the light sensing unit 1602 and the compensation unit 1604, a first light component of the light corresponding to the first color causes the light sensing unit 1602 to generate a first current, and a second light component of the light corresponding to the second color causes the compensation unit 1604 to generate a second current. The second current reduces the magnitude of the charging current or the discharging current when the capacitor C1 is charged or discharged by the first current. When the switching element Tsw is turned on, the voltage of the capacitor C1 is read and used as information for determining the color of the light. The first light sensing transistor Tp1 and the second light sensing transistor Tp2 are diode-connected thin film transistors.

The compensation unit 1604 further includes a third light sensing transistor Tp3. The first light sensing transistor Tp1, the second light sensing transistor Tp2, and the third light sensing transistor Tp3 are respectively used to sense different colors. For example, the first light sensing transistor Tp1, the second light sensing transistor Tp2, and the third light sensing transistor Tp3 could respectively be used to sense red, green, and blue colors, the first light sensing transistor Tp1, the second light sensing transistor Tp2, and the third light sensing transistor Tp3 could respectively be used to sense green, red, and blue colors, or the first light sensing transistor Tp1, the second light sensing transistor Tp2, and the third light sensing transistor Tp3 could respectively be used to sense blue, red, and green colors.

The capacitor C1 has a first end N1 and a second end N2. The third light sensing transistor Tp3 is a diode-connected thin film transistor. One end and the gate of the first light sensing transistor Tp1, one end of the second light sensing transistor Tp2, and one end of the third light sensing transistor Tp3 are electrically connected to the first end N1 of the capacitor C1. The other end and the gate of the second light sensing transistor Tp2 and the other end and the gate of the third light sensing transistor Tp3 are electrically connected to the second end N2 of the capacitor C1. The switching element Tsw is electrically connected to the first end N1 of the capacitor C1.

Figure 17:
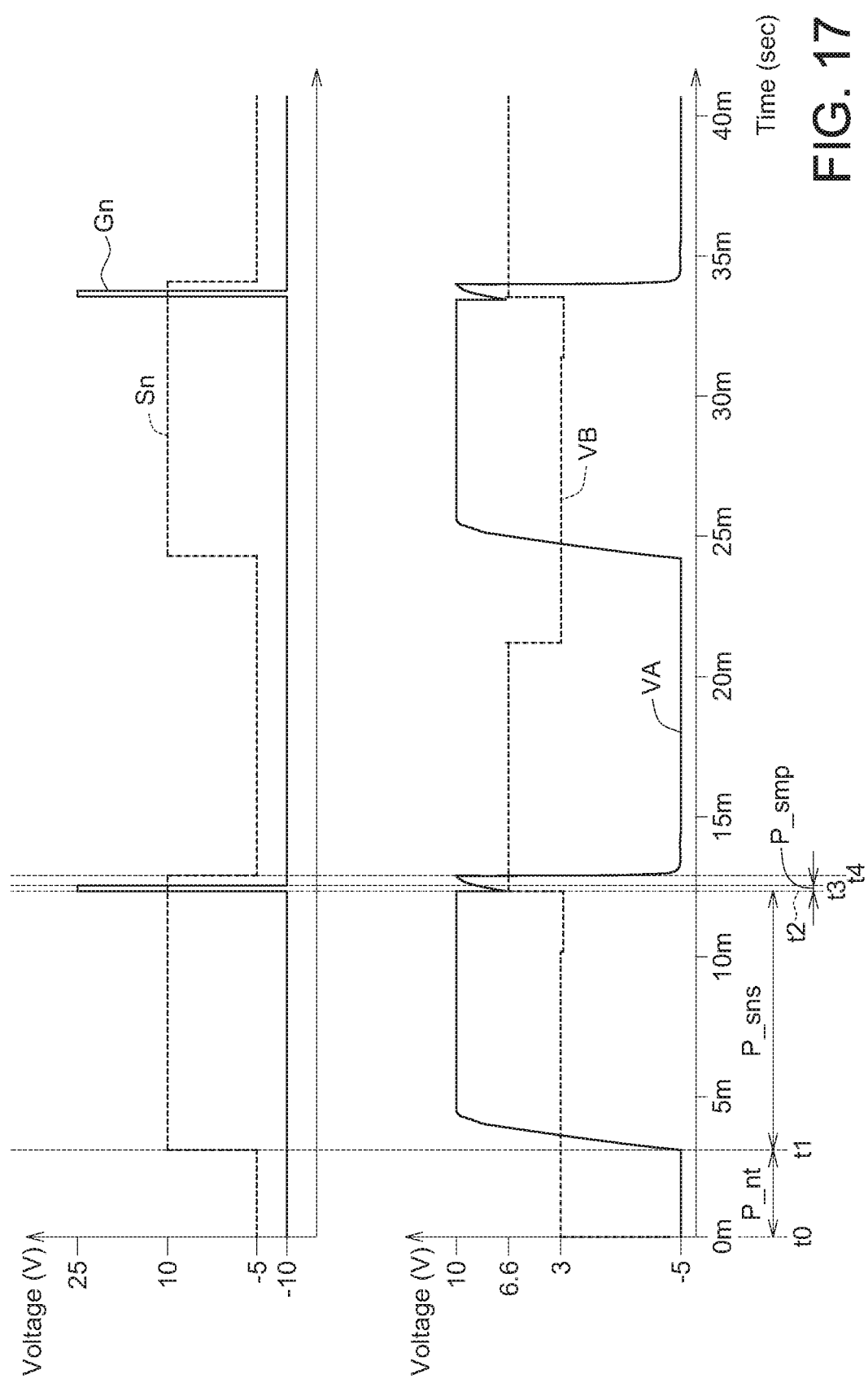
FIG. 17 is an example of a simulated waveform diagram of relevant signals of the optical sensing circuit of FIG. 16 under the circumstances that the ambient light is 2000 lux and a red input light source exists.

Referring to FIG. 17, an example of a simulated waveform diagram of relevant signals of the optical sensing circuit 1600 of FIG. 16 under the circumstances that the ambient light is 2000 lux and a red input light source exists is shown. The other end of the first light sensing transistor Tp1 receives an operating signal Sn. The switching element Tsw is controlled by a scan signal Gn. During the initial period P_nt between time points t0 and t1, the operating signal Sn has a first voltage for initializing the voltage value of the capacitor C1. During the sensing period P_sns between time points t1 and t2, the operating signal Sn has a second voltage. When the light illuminates the light sensing unit 1602 and the compensation unit 1604, the first light component of the light corresponding to the first color causes the light sensing unit 1602 to generate a first current, and the second light component of the light corresponding to the second color causes the compensation unit 1604 to generate a second current. During the sampling period P_smp between time points t2 and t3, the scan signal Gn is enabled, such that the switching element Tsw is turned on and the voltage of the capacitor C1 is read. Due to the existence of the red input light source, the voltage VA of the capacitor C1 could be charged to a high voltage (such as charged to 10V in the present example) during the sensing period P_sns. Therefore, at time point t2, the switching element Tsw which has been turned on will cause the charges of the capacitors C1 and C2 to be re-distributed and cause the voltage VB of the capacitor C2 to be increased (such as be increased to 6.6V in the present example). Since the voltage VB is greater than the threshold, it could be determined that the input light source exists.

Figure 18:
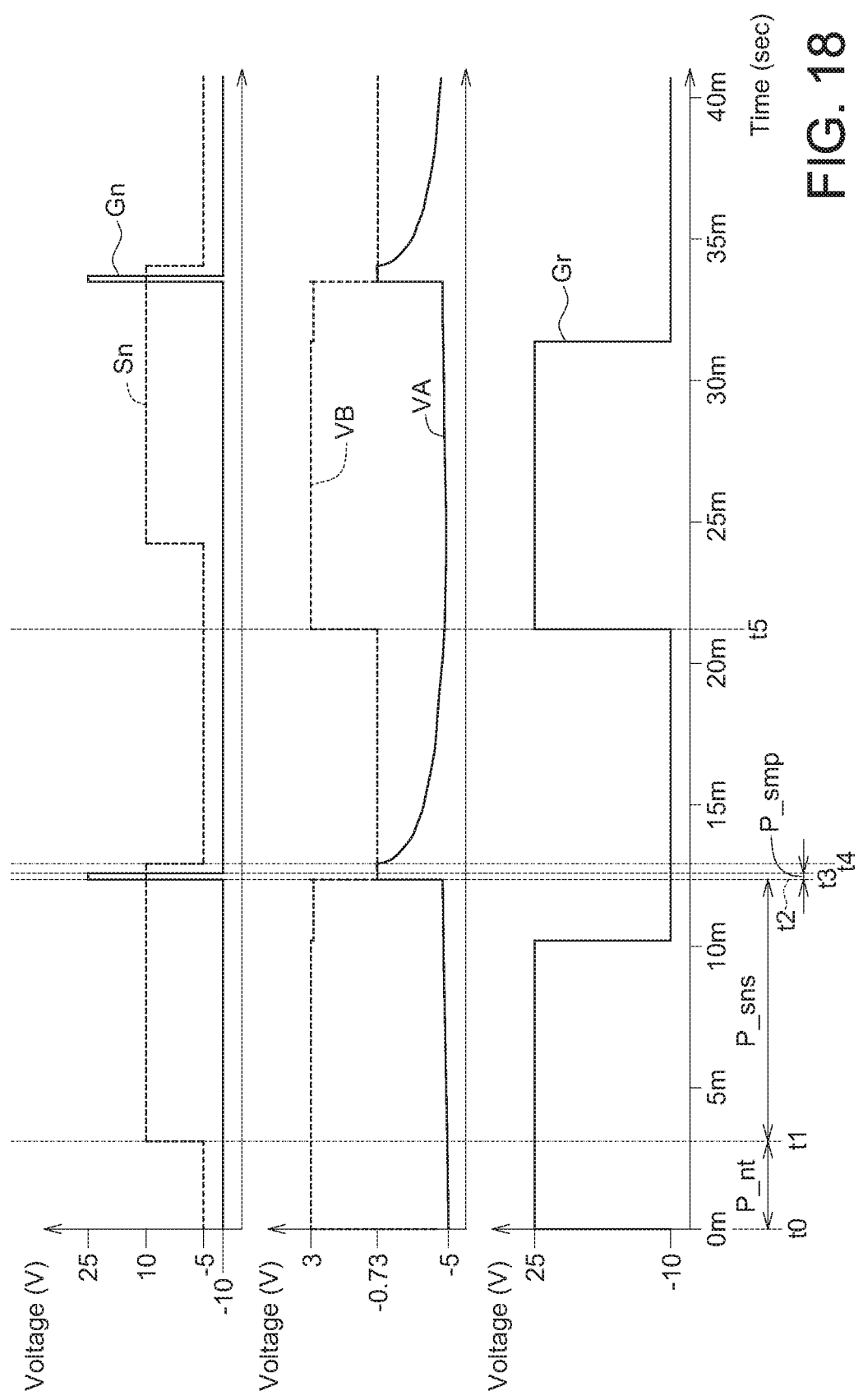
FIG. 18, an example of a simulated waveform diagram of relevant signals of the optical sensing circuit of FIG. 16 under the circumstances that the ambient light is 2000 lux and the red input light source does not exist.

Referring to FIG. 18, an example of a simulated waveform diagram of relevant signals of the optical sensing circuit 1600 of FIG. 16 under the circumstances that the ambient light is 2000 lux and the red input light source does not exist is shown. During the initial period P_nt between time points t0 and t1, the operating signal Sn has a first voltage for initializing the voltage value of the capacitor C1. During the sensing period P_sns between time points t1 and t2, the operating signal Sn has a second voltage. At this time, since the input light source does not exist, almost no current will flow to the capacitor C1 to charge the capacitor C1. During the sampling period P_smp between time points t2 and t3, the scan signal Gn is enabled, such that the switching element Tsw is turned on and the voltage of the capacitor C1 is read. During the sensing period P_sns, since the input light source does not exist and the voltage VA of the capacitor C1 maintains at a low voltage (such pnas −5V in the present example), at time point t2, the switching element Tsw which has been turned on will cause the charges of the capacitors C1 and C2 to be re-distributed and cause the voltage VB of the capacitor C2 to be decreased (such as to be decreased to −0.73V in the present example). Since the voltage VB is smaller than the threshold, it could be determined that the input light source does not exist.

Figure 19:
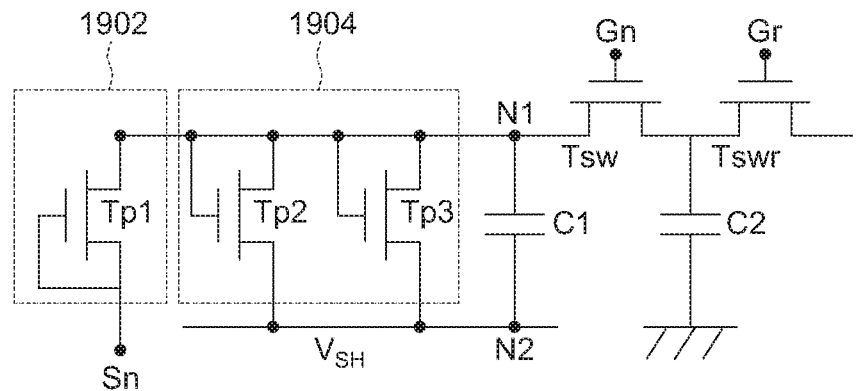
FIG. 19 is a circuit diagram of an optical sensing circuit according to another embodiment of the present disclosure.

Referring to FIG. 19, a circuit diagram of an optical sensing circuit 1900 according to another embodiment of the present disclosure is shown. The optical sensing circuit 1900 is a discharge mode optical sensing circuit. The optical sensing circuit 1900 includes a capacitor C1, a light sensing unit 1902, a compensation unit 1904, and a switching element Tsw. The light sensing unit 1902, electrically connected to the capacitor C1, includes a first light sensing transistor Tp1 and is configured to sense a first color. The compensation unit 1904, electrically connected to the capacitor C1, includes a second light sensing transistor Tp2 and is configured to sense a second color. The spectrum of the second color and the spectrum of the first color do not overlap with each other. The switching element Tsw is electrically connected to the capacitor C1. When a light illuminates the light sensing unit 1902 and the compensation unit 1904, a first light component of the light corresponding to the first color causes the light sensing unit 1902 to generate a first current, and a second light component of the light corresponding to the second color causes the compensation unit 1904 to generate a second current. The second current reduces the magnitude of the charging current or the discharging current when the capacitor C1 is charged or discharged by the first current. When the switching element Tsw is turned on, the voltage of the capacitor C1 is read and used as information for determining the color of the light.

The first light sensing transistor Tp1 and the second light sensing transistor Tp2 are diode-connected thin film transistors.

The capacitor C1 has a first end N1 and a second end N2. The third light sensing transistor Tp3 is a diode-connected thin film transistor. One end of the first light sensing transistor Tp1, one end and the gate of the second light sensing transistor Tp2, and one end and the gate of the third light sensing transistor Tp3 are electrically connected to the first end N1 of the capacitor C1. The other end and the gate of the first light sensing transistor Tp1 are coupled to each other. The other end of the second light sensing transistor Tp2 and the other end of the third light sensing transistor Tp3 are electrically connected to the second end N2 of the capacitor C1. The switching element Tsw is electrically connected to the first end N1 of the capacitor C1.

Figure 20A:
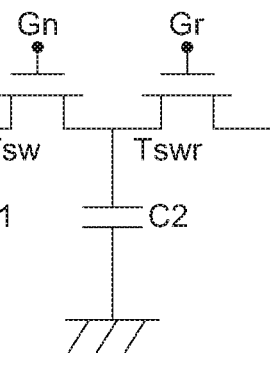
FIG. 20A-20C illustrate the operations of the optical sensing circuit of FIG. 19.
Figure 20B:
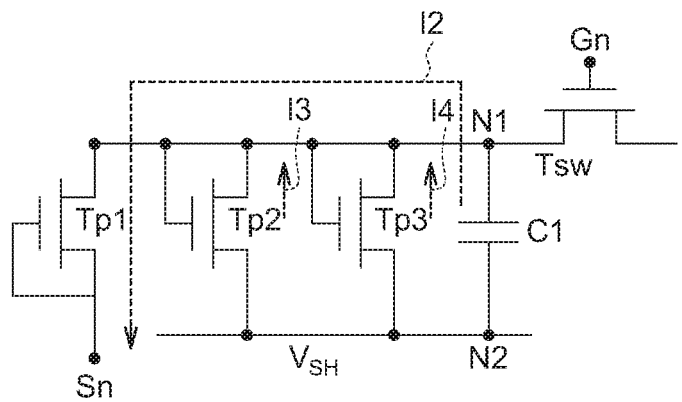
Figure 20C:
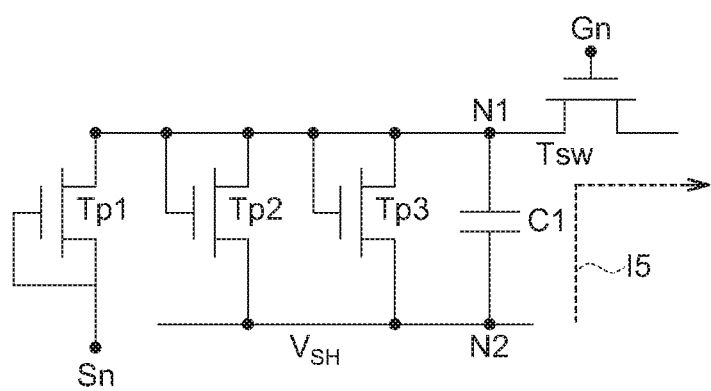
Figure 21:
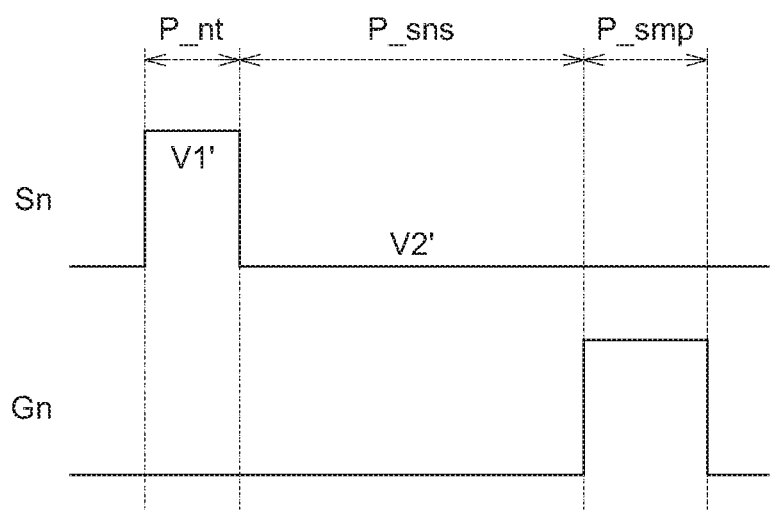
FIG. 21 is a waveform diagram of relevant signals of the optical sensing circuit of FIG. 19.

Refer to FIGS. 20A~20C, which illustrate the operations of the optical sensing circuit 1900 of FIG. 19. Also, referring to FIG. 21, a waveform diagram of relevant signals of the optical sensing circuit 1900 of FIG. 19 is shown. The other end and the gate of the first light sensing transistor Tp1 receive an operating signal Sn. The switching element Tsw is controlled by a scan signal Gn. During the initial period P_nt, the operating signal Sn has a first voltage V1' for initializing the voltage value of the capacitor C1. As indicated in FIG. 20A, the first light sensing transistor Tp1 which has been turned on generates a current I1 for charging the capacitor C1, such that the first end N1 of the capacitor C1 has a high voltage.

During the sensing period P_sns, the operating signal Sn has a second voltage V2'. When the light illuminates the light sensing unit 1902 and the compensation unit 1904, the first light component of the light corresponding to the first color causes the light sensing unit 1902 to generate a first current (such as the current I2 of FIG. 20B), and the second light component of the light corresponding to the second color causes the compensation unit 1904 to generate a second current (such as the currents I3 and I4 of FIG. 20B). The first current (such as the current I2 of FIG. 20B) causes the voltage of the capacitor C1 to be decreased. The second current (such as the currents I3 and I4 of FIG. 20B) reduces the magnitude of the discharging current when the capacitor C1 is discharged by the first current (such as the current I2 of FIG. 20B). That is, the second current (such as the currents I3 and I4 of FIG. 20B) compensates the first current (such as the current I2 of FIG. 20B) and reduces the drop in the voltage of the capacitor C1 caused by the first current (such as the current I2 of FIG. 20B).

During the sampling period P_smp, the scan signal Gn is enabled, such that the switching element Tsw is turned on and the voltage of the capacitor C1 is read. As shown in FIG. 20C, when the scan signal Gn is enabled and the switching element Tsw is turned on, the current I5 flows to the capacitor C2 and charges the capacitor C2 (not shown in FIG. 20C). Afterwards, when the read signal Gr is enabled and the switching element Tswr is turned on, the voltage of the capacitor C2 is read, and whether an input light source illuminates the optical sensing circuit 1900 is determined according to the read voltage of the capacitor C2. The second end N2 of the capacitor C1 is biased at the voltage VSH.

According to the embodiment of the present disclosure, a method for determining light color using an optical sensing circuit is provided. The method includes the following steps. An optical sensing circuit, including a capacitor, a light sensing unit, a compensation unit, and a switching element, is provided. The light sensing unit, electrically connected to the capacitor, includes a first light sensing transistor and is configured to sense a first color. The compensation unit, electrically connected to the capacitor, includes a second light sensing transistor and is configured to sense a second color. The spectrum of the second color and the spectrum of the first color do not overlap with each other. The switching element is electrically connected to the capacitor. One end of the first light sensing transistor receives an operating signal, and the switching element is controlled by a control signal. During an initial period, the operating signal has a first voltage for initializing the voltage value of the capacitor. During a sensing period, the operating signal has a second voltage. When the light illuminates the light sensing unit and the compensation unit, the first light component of the light corresponding to the first color causes the light sensing unit to generate a first current, and the second light component of the light corresponding to the second color causes the compensation unit to generate a second current. The second current reduces the magnitude of the charging current or the discharging current when the capacitor is charged or discharged by the first current. During a sampling period, the scan signal is enabled, such that the switching element is turned on and the voltage of the capacitor is read and used as information for determining the color of the light. The voltage level of at least one of the gate of the first light sensing transistor and the gate of the second light sensing transistor is adjustable.

The voltage level of at least one of the gate of the first light sensing transistor and the gate of the second light sensing transistor could be adjusted according to the intensity of an ambient light or the intensity of the light.

According to the embodiment of the present disclosure, a method for determining light color using an optical sensing circuit is provided. The method includes the following steps. An optical sensing circuit, including a capacitor, a light sensing unit, a compensation unit, and a switching element, is provided. The light sensing unit, electrically connected to the capacitor, includes a first light sensing transistor and is configured to sense a first color. The compensation unit, electrically connected to the capacitor, includes a second light sensing transistor and is configured to sense a second color. The spectrum of the second color and the spectrum of the first color do not overlap with each other. The switching element is electrically connected to the capacitor. One end of the first light sensing transistor receives an operating signal, and the switching element is controlled by a control signal. During an initial period, the operating signal has a first voltage for initializing the voltage value of the capacitor. During a sensing period, the operating signal has a second voltage. When the light illuminates the light sensing unit and the compensation unit, the first light component of the light corresponding to the first color causes the light sensing unit to generate a first current, and the second light component of the light corresponding to the second color causes the compensation unit to generate a second current. The second current reduces the magnitude of the charging current or the discharging current when the capacitor is charged or discharged by the first current. During a sampling period, the scan signal is enabled, such that the switching element is turned on and the voltage of the capacitor is read and used as information for determining the color of the light. The first light sensing transistor and the second light sensing transistor are diode-connected thin film transistors.

The optical sensing circuit and the method for determining the light color using the same of the present disclosure could, under the illumination of a strong ambient light, such as an ambient white light, compensate the current generated by the ambient light to avoid error actions. Moreover, in some embodiments, the gate voltage of the thin film transistor could be adjusted to compensate the input light source with lower intensity or the ambient light source with higher intensity and increase the accuracy in the determination of whether any input light source illuminates the optical sensing circuit.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical sensing circuit, comprising:
   a capacitor;
   a light sensing unit, electrically connected to the capacitor, wherein the light sensing unit comprises a first light sensing transistor and is configured to sense a first color;
   a compensation unit, electrically connected to the capacitor, wherein the compensation unit comprises a second light sensing transistor and is configured to sense a second color, the spectrum of the second color and the spectrum of the first color do not overlap with each other;
   a switching element, electrically connected to the capacitor;
   wherein when a light illuminates the light sensing unit and the compensation unit, a first light component of the light corresponding to the first color causes the light sensing unit to generate a first current, and a second light component of the light corresponding to the second color causes the compensation unit to generate a second current, the second current reduces the magnitude of the charging current or the discharging current when the capacitor is charged or discharged by the first current;
   wherein when the switching element is turned on, the voltage of the capacitor is read and used as information for determining the color of the light;
   wherein the voltage level of at least one of the gate of the first light sensing transistor and the gate of the second light sensing transistor is adjustable.

2. The optical sensing circuit according to claim 1, wherein the voltage level of the at least one of the gate of the first light sensing transistor and the gate of the second light sensing transistor is adjustable according to the intensity of an ambient light or the intensity of the light.

3. The optical sensing circuit according to claim 1, wherein the compensation unit further comprises a third light sensing transistor, the first light sensing transistor, the second light sensing transistor, and the third light sensing transistor are respectively used to sense different colors.

4. The optical sensing circuit according to claim 3, wherein the first light sensing transistor, the second light sensing transistor, and the third light sensing transistor are capable of being respectively used to sense red, green, and blue colors, the first light sensing transistor, the second light sensing transistor, and the third light sensing transistor are capable of being respectively used to sense green, red, and blue colors, or the first light sensing transistor, the second light sensing transistor, and the third light sensing transistor are capable of being respectively used to sense blue, red, and green colors.

5. The optical sensing circuit according to claim 3, wherein the capacitor has a first end and a second end, the gate of the first light sensing transistor is controlled by a first control signal, the second light sensing transistor and the third light sensing transistor are diode-connected thin film transistors, one end of the first light sensing transistor, one end of the second light sensing transistor, and one end of the third light sensing transistor are electrically connected to the first end of the capacitor, the other end and the gate of the second light sensing transistor and the other end and the gate of the third light sensing transistor are electrically connected to the second end of the capacitor, the switching element is electrically connected to the first end of the capacitor.

6. The optical sensing circuit according to claim 3, wherein the capacitor has a first end and a second end, the gate of the first light sensing transistor, the gate of the second light sensing transistor, and the gate of the third light sensing transistor are controlled by a first control signal, one end of the first light sensing transistor, one end of the second light sensing transistor, and one end of the third light sensing transistor are electrically connected to the first end of the capacitor, the other end of the second light sensing transistor and the other end of the third light sensing transistor are electrically connected to the second end of the capacitor, the switching element is electrically connected to the first end of the capacitor.

7. The optical sensing circuit according to claim 3, wherein the capacitor has a first end and a second end, the gate of the second light sensing transistor and the gate of the third light sensing transistor are controlled by a second control signal, the first light sensing transistor is a diode-connected thin film transistor, one end and the gate of the first light sensing transistor, one end of the second light sensing transistor, and one end of the third light sensing transistor are electrically connected to the first end of the capacitor, the other end of the second light sensing transistor and the other end of the third light sensing transistor are electrically connected to the second end of the capacitor, the switching element is electrically connected to the first end of the capacitor.

8. The optical sensing circuit according to claim 3, wherein the capacitor has a first end and a second end, the gate of the first light sensing transistor is controlled by a first control signal, the gate of the second light sensing transistor and the gate of the third light sensing transistor are controlled by a second control signal, one end of the first light sensing transistor, one end of the second light sensing transistor, and one end of the third light sensing transistor are electrically connected to the first end of the capacitor, the other end of the second light sensing transistor and the other end of the third light sensing transistor are electrically connected to the second end of the capacitor, the switching element is electrically connected to the first end of the capacitor.

9. The optical sensing circuit according to claim 3, wherein the capacitor has a first end and a second end, the gate of the second light sensing transistor and the gate of the third light sensing transistor are controlled by a first control signal, the gate of the first light sensing transistor receives the first control signal through a bias resistor, one end of the first light sensing transistor, one end of the second light sensing transistor, and one end of the third light sensing transistor are electrically connected to the first end of the capacitor, the other end of the second light sensing transistor and the other end of the third light sensing transistor are electrically connected to the second end of the capacitor, the switching element is electrically connected to the first end of the capacitor.

10. The optical sensing circuit according to claim 1, wherein one end of the first light sensing transistor of the light sensing unit is electrically connected to the capacitor, the other end of the first light sensing transistor is configured to receive an operating signal, and the switching element is controlled by a scan signal, during an initial period, the operating signal has a first voltage for initializing the voltage value of the capacitor, during a sensing period, the operating signal has a second voltage, when the light illuminates the light sensing unit and the compensation unit, the first light component of the light corresponding to the first color causes the light sensing unit to generate a first current, and the second light component of the light corresponding to the second color causes the compensation unit to generate a second current, during a sampling period, the scan signal is enabled, such that the switching element is turned on and the voltage of the capacitor is read.

11. An optical sensing circuit, comprising:
a capacitor;
a light sensing unit, electrically connected to the capacitor, wherein the light sensing unit comprises a first light sensing transistor and is configured to sense a first color;
a compensation unit, electrically connected to the capacitor, wherein the compensation unit comprises a second light sensing transistor and is configured to sense a second color, the spectrum of the second color and the spectrum of the first color do not overlap with each other;
a switching element, electrically connected to the capacitor;
wherein when a light illuminates the light sensing unit and the compensation unit, a first light component of the light corresponding to the first color causes the light sensing unit to generate a first current, and a second light component of the light corresponding to the second color causes the compensation unit to generate a second current, the second current reduces the magnitude of the charging current or the discharging current when the capacitor is charged or discharged by the first current;
wherein when the switching element is turned on, the voltage of the capacitor is read and used as information for determining the color of the light;
wherein the first light sensing transistor and the second light sensing transistor are diode-connected thin film transistors.

12. The optical sensing circuit according to claim 11, wherein the compensation unit further comprises a third light sensing transistor, the first light sensing transistor, the second light sensing transistor, and the third light sensing transistor are respectively used to sense different colors.

13. The optical sensing circuit according to claim 12, wherein the first light sensing transistor, the second light sensing transistor, and the third light sensing transistor are respectively used to sense red, green, and blue colors, the first light sensing transistor, the second light sensing transistor, and the third light sensing transistor respectively are used to sense green, red, and blue colors, or the first light sensing transistor, the second light sensing transistor, and the third light sensing transistor respectively are used to sense blue, red, and green colors.

14. The optical sensing circuit according to claim 12, wherein the capacitor has a first end and a second end, the third light sensing transistor is a diode-connected thin film transistor, one end and the gate of the first light sensing transistor, one end of the second light sensing transistor, and one end of the third light sensing transistor are electrically connected to the first end of the capacitor, the other end and the gate of the second light sensing transistor and the other end and the gate of the third light sensing transistor are electrically connected to the second end of the capacitor, the switching element is electrically connected to the first end of the capacitor.

15. The optical sensing circuit according to claim 14, wherein the other end of the first light sensing transistor is configured to receive an operating signal, and the switching element is controlled by a scan signal, during an initial period, the operating signal has a first voltage for initializing the voltage value of the capacitor, during a sensing period, the operating signal has a second voltage, when the light illuminates the light sensing unit and the compensation unit, the first light component of the light corresponding to the first color causes the light sensing unit to generate a first current, and the second light component of the light corresponding to the second color causes the compensation unit to generate a second current, during a sampling period, the scan signal is enabled, such that the switching element is turned on and the voltage of the capacitor is read.

16. The optical sensing circuit according to claim 12, wherein the capacitor has a first end and a second end, the third light sensing transistor is a diode-connected thin film transistor, one end of the first light sensing transistor, one end and the gate of the second light sensing transistor, and one end and the gate of the third light sensing transistor are electrically connected to the first end of the capacitor, the other end and the gate of the first light sensing transistor are coupled to each other, the other end of the second light sensing transistor and the other end of the third light sensing transistor are electrically connected to the second end of the capacitor, the switching element is electrically connected to the first end of the capacitor.

17. The optical sensing circuit according to claim 16, wherein the other end and the gate of the first light sensing transistor is configured to receive an operating signal, and the switching element is controlled by a scan signal, during an initial period, the operating signal has a first voltage for initializing the voltage value of the capacitor, during a sensing period, the operating signal has a second voltage, when the light illuminates the light sensing unit and the compensation unit, the first light component of the light corresponding to the first color causes the light sensing unit to generate a first current, and the second light component of the light corresponding to the second color causes the compensation unit to generate a second current, during a sampling period, the scan signal is enabled, such that the switching element is turned on and the voltage of the capacitor is read.

18. A method for determining light color using an optical sensing circuit, comprising:
providing an optical sensing circuit, the optical sensing circuit comprising a capacitor, a light sensing unit, a compensation unit, and a switching element, wherein the light sensing unit, electrically connected to the capacitor, comprises a first light sensing transistor and is configured to sense a first color, the compensation unit, electrically connected to the capacitor, comprises a second light sensing transistor and is configured to sense a second color, the spectrum of the second color and the spectrum of the first color do not overlap with each other, the switching element is electrically connected to the capacitor, one end of the first light sensing transistor receives an operating signal, and the switching element is controlled by a control signal;

making the operating signal having a first voltage for initializing the voltage value of the capacitor during an initial period;

making the operating signal having a second voltage during a sensing period, when the light illuminates the light sensing unit and the compensation unit, the first light component of the light corresponding to the first color causes the light sensing unit to generate a first current, and the second light component of the light corresponding to the second color causes the compensation unit to generate a second current, the second current reduces the magnitude of the charging current or the discharging current when the capacitor is charged or discharged by the first current;

enabling the scan signal during a sampling period, such that the switching element is turned on and the voltage of the capacitor is read and used as an information for determining the color of the light;

wherein the voltage level of at least one of the gate of the first light sensing transistor and the gate of the second light sensing transistor is adjustable.

19. The method according to claim 18, wherein the voltage level of at least one of the gate of the first light sensing transistor and the gate of the second light sensing transistor is adjustable according to the intensity of an ambient light or the intensity of the light.

20. A method for determining light color using an optical sensing circuit, comprising:

providing an optical sensing circuit, the optical sensing circuit comprising a capacitor, a light sensing unit, a compensation unit, and a switching element, wherein the light sensing unit, electrically connected to the capacitor, comprises a first light sensing transistor and is configured to sense a first color, the compensation unit, electrically connected to the capacitor, comprises a second light sensing transistor and is configured to sense a second color, the spectrum of the second color and the spectrum of the first color do not overlap with each other, the switching element is electrically connected to the capacitor, one end of the first light sensing transistor receives an operating signal, and the switching element is controlled by a control signal;

making the operating signal having a first voltage for initializing the voltage value of the capacitor during an initial period;

making the operating signal having a second voltage during a sensing period, when the light illuminates the light sensing unit and the compensation unit, the first light component of the light corresponding to the first color causes the light sensing unit to generate a first current, and the second light component of the light corresponding to the second color causes the compensation unit to generate a second current, the second current reduces the magnitude of the charging current or the discharging current when the capacitor is charged or discharged by the first current;

during a sampling period, enabling the scan signal, such that the switching element is turned on and the voltage of the capacitor is read and used as an information for determining the color of the light;

wherein the first light sensing transistor and the second light sensing transistor are diode-connected thin film transistors.

* * * * *